(12) United States Patent
Baumann et al.

(10) Patent No.: US 8,967,235 B2
(45) Date of Patent: Mar. 3, 2015

(54) HEAT EXCHANGER, METHOD FOR THE PRODUCTION OF A HEAT EXCHANGER

(75) Inventors: Uwe Baumann, Stuttgart (DE); Heinz Czemmel, Rutesheim (DE); Aydin Dogan, Stuttgart (DE); Karsten Emrich, Stuttgart (DE); Fabrice Frechard, Stuttgart (DE); Peter Hafenbrak, Bad Rappenau (DE); Thomas Mitchell, Sindelfingen (DE); Johannes Pfeffer, Tübingen (DE)

(73) Assignee: Behr GmbH & Co. KG, Stuttgart (DE)

( * ) Notice: Subject to any disclaimer, the term of this patent is extended or adjusted under 35 U.S.C. 154(b) by 1546 days.

(21) Appl. No.: 12/091,642

(22) PCT Filed: Oct. 26, 2006

(86) PCT No.: PCT/EP2006/010317
§ 371 (c)(1),
(2), (4) Date: Jun. 26, 2008

(87) PCT Pub. No.: WO2007/048603
PCT Pub. Date: May 3, 2007

(65) Prior Publication Data
US 2008/0289804 A1    Nov. 27, 2008

(30) Foreign Application Priority Data

Oct. 26, 2005 (DE) .................. 10 2005 051 517
Dec. 8, 2005 (DE) .................. 10 2005 059 054

(51) Int. Cl.
*F28D 7/16* (2006.01)
*F28F 9/00* (2006.01)
(Continued)

(52) U.S. Cl.
CPC ............ *F28F 9/005* (2013.01); *F02M 25/0714* (2013.01); *F02M 25/0728* (2013.01);
(Continued)

(58) Field of Classification Search
USPC .................. 165/109.1, 103, 158, 163, 78
See application file for complete search history.

(56) References Cited

U.S. PATENT DOCUMENTS 1,946,234 A * 2/1934 Price .............................. 165/162
2,360,094 A * 10/1944 Arvins et al. .................... 165/70
(Continued)

FOREIGN PATENT DOCUMENTS

DE          600 04 919 T2    7/2004
DE   10 2004 045 016 A1      6/2005
(Continued)

OTHER PUBLICATIONS

Office Action mailed Dec. 13, 2011 in related Japanese application No. 2008-537003 (3 pgs.).
(Continued)

*Primary Examiner* — Allen Flanigan
(74) *Attorney, Agent, or Firm* — Foley & Lardner LLP

(57) ABSTRACT

Disclosed is a heat exchanger, especially an exhaust gas heat exchanger, comprising a housing (101, 201, 301, 401, 501, 601, 702, 801, 901, 1101, 1401, 1501, 1901, 2001, 2101, 2201) which can be penetrated by at least one first medium (M1) and at least one second medium (M2), and at least one sealing element (213, 607, 707, 906, 1006, 1011, 1411, 1506, 2205). At least one flow means (217, 1507, 1507a, 1508, 1904, 2005, 2105, 2206, 2206a, 2206b), around which the second medium flows, is provided inside the housing, said flow means improving heat transfer from the first medium to the second medium.

52 Claims, 17 Drawing Sheets

Figure 1:
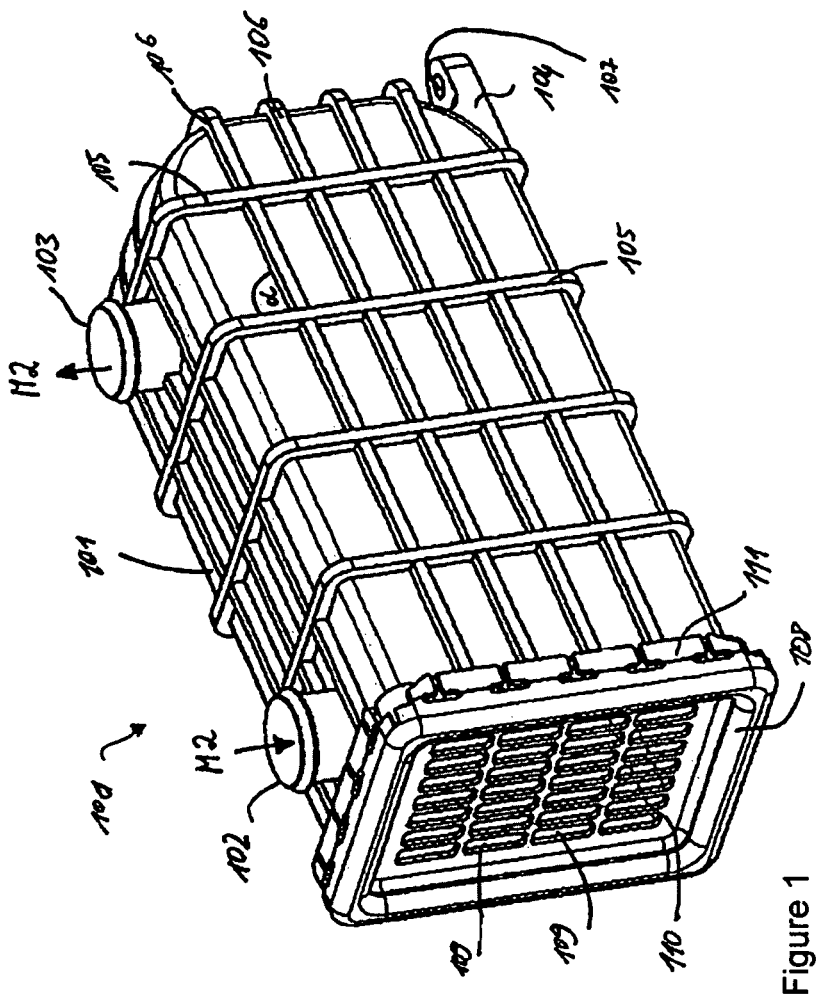

(51) Int. Cl.

| | | |
|---|---|---|
| *F02M 25/07* | (2006.01) | |
| *F28F 1/42* | (2006.01) | |
| *F28F 9/22* | (2006.01) | |
| *F28F 21/06* | (2006.01) | |
| *F28D 21/00* | (2006.01) | |

(52) U.S. Cl.
CPC ......... *F02M25/0737* (2013.01); *F28D 7/1692* (2013.01); *F28F 1/42* (2013.01); *F28F 1/422* (2013.01); *F28F 9/00* (2013.01); *F28F 9/22* (2013.01); *F28F 21/067* (2013.01); *F28D 21/0003* (2013.01); *Y02T 10/121* (2013.01); *F28F 2255/143* (2013.01); *F28F 2225/02* (2013.01); *F28F 2230/00* (2013.01); *F28F 2265/10* (2013.01)
USPC .............. 165/78; 165/103; 165/158; 165/176

(56) References Cited

U.S. PATENT DOCUMENTS

| | | | | |
|---|---|---|---|---|
| 2,362,985 | A * | 11/1944 | Brown, Jr. | 165/154 |
| 3,254,709 | A * | 6/1966 | Lyall | 165/158 |
| 3,301,321 | A * | 1/1967 | Poore | 165/178 |
| 3,804,161 | A * | 4/1974 | Nowak | 165/158 |
| 4,221,261 | A * | 9/1980 | Wunder et al. | 165/74 |
| 4,590,888 | A * | 5/1986 | Mosig | 122/149 |
| 4,733,722 | A | 3/1988 | Forbes et al. | |
| 4,778,003 | A * | 10/1988 | Helberg | 165/158 |
| 4,997,035 | A * | 3/1991 | Beatenbough et al. | 165/173 |
| 6,311,678 | B1 | 11/2001 | Lepoutre | |
| 6,321,835 | B1 * | 11/2001 | Damsohn et al. | 165/159 |
| 6,955,213 | B2 * | 10/2005 | Stonehouse et al. | 165/103 |
| 7,438,062 | B2 * | 10/2008 | Okawa et al. | 123/568.12 |
| 2003/0111211 | A1 * | 6/2003 | Stonehouse et al. | 165/103 |
| 2004/0226694 | A1 | 11/2004 | Dilley et al. | |
| 2005/0103479 | A1 * | 5/2005 | Richardson | 165/109.1 |
| 2007/0056720 | A1 | 3/2007 | Demuth et al. | |
| 2007/0131399 | A1 * | 6/2007 | Digele | 165/158 |

FOREIGN PATENT DOCUMENTS

| | | |
|---|---|---|
| EP | 0 010 499 A1 | 4/1980 |
| EP | 1 146 310 A1 | 10/2001 |
| EP | 1 179 722 A1 | 2/2002 |
| EP | 1 258 613 A2 | 11/2002 |
| EP | 1 363 012 A1 | 11/2003 |
| GB | 1 297 941 | 11/1972 |
| JP | 55160296 A | 12/1980 |
| JP | 1-144682 U | 4/1989 |
| JP | 5-034084 A | 2/1993 |
| JP | 11-013554 A | 1/1999 |
| JP | 2000-097113 A | 4/2000 |
| JP | 2003-074351 A | 3/2003 |
| JP | 2003-106785 A | 4/2003 |
| JP | 2005-525505 | 8/2005 |
| WO | WO 2005/038375 A1 | 4/2005 |

OTHER PUBLICATIONS

Office Action mailed Dec. 11, 2012 in related Japanese application No. 2008-537003 (2 pgs.).

* cited by examiner

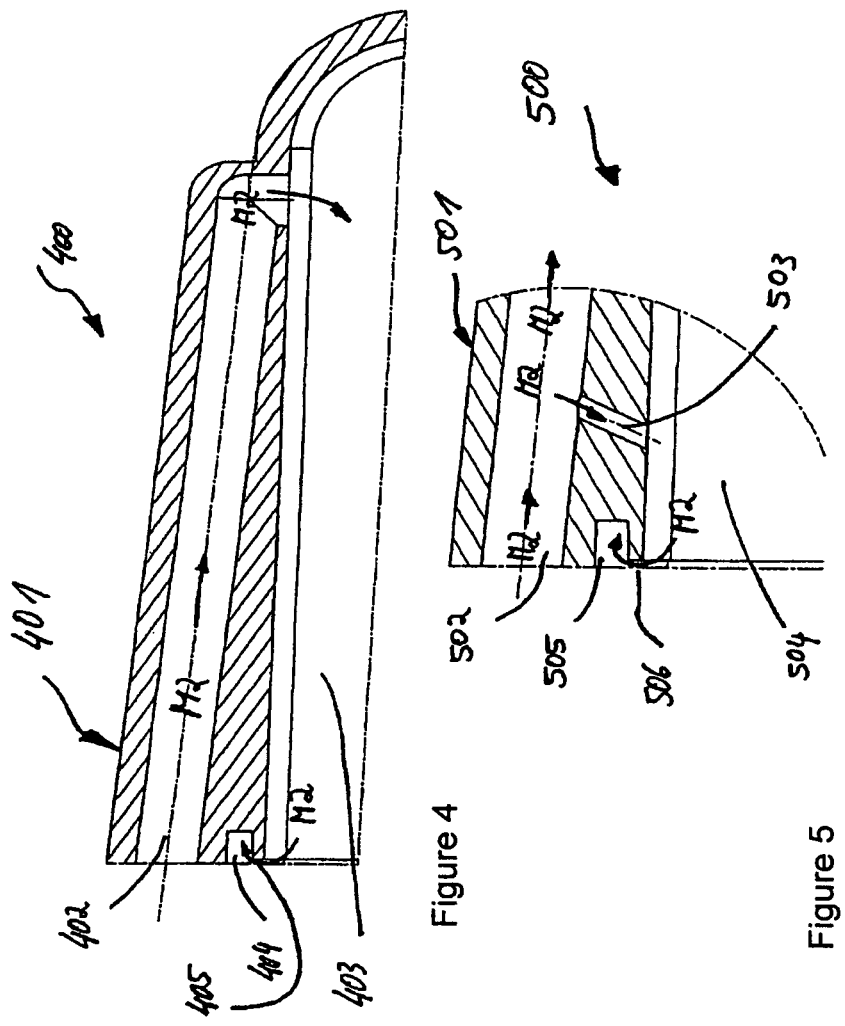

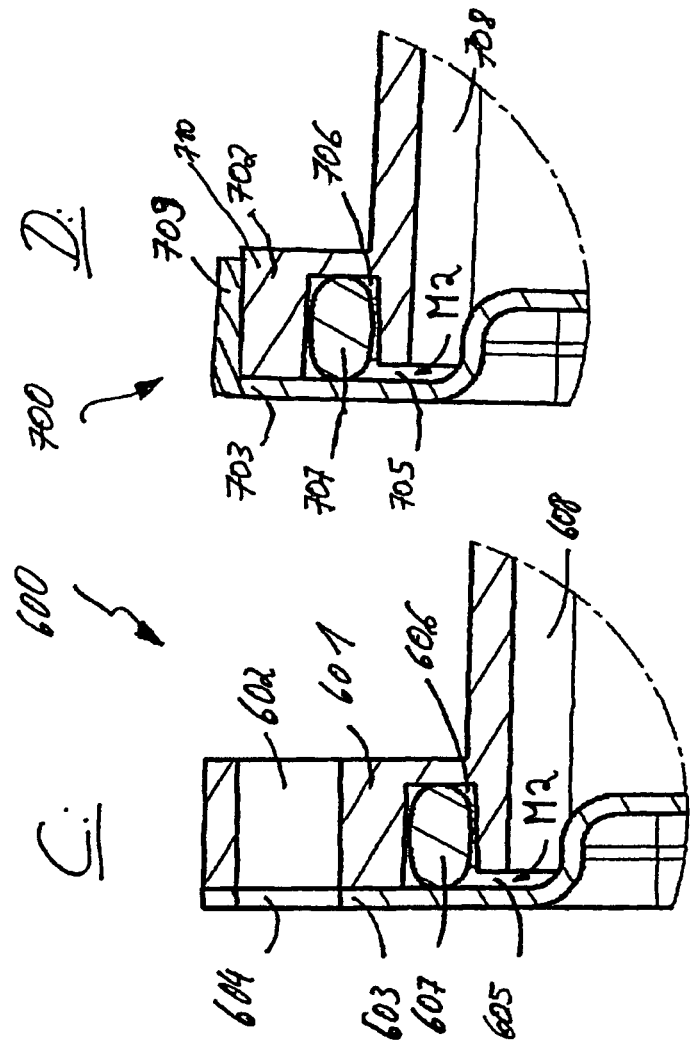

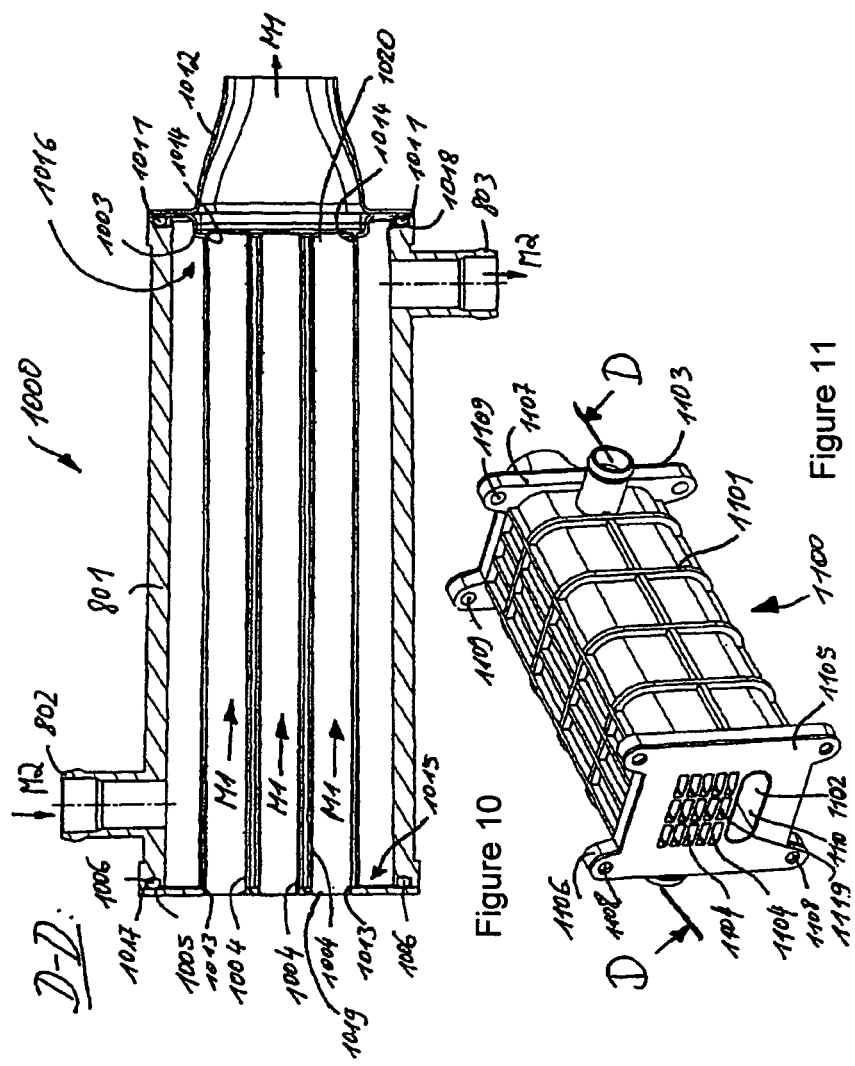

HEAT EXCHANGER, METHOD FOR THE PRODUCTION OF A HEAT EXCHANGER

The invention relates to a heat exchanger having a housing through which at least one first medium and at least one second medium can flow and having at least one sealing element which comes into contact at least in sections with the second medium, and to a method for producing a heat exchanger.

DE 600 04 919 T2 discloses a heat exchanger which has a hollow body which is composed of plastic material and which defines an air inlet chamber, an inlet for the air and one or more outlets for connecting to the head of an engine. The heat exchanger has a seal between a first metallic element and a partition. The seal is in particular a ring seal in the case of a cylindrical heat exchanger. The heat exchanger likewise has a seal between a second metallic element and the partition, of the chamber which forms a lining. The ring seal makes it possible to intensify the impermeability of the connection between the partition composed of plastic and the bell composed of metallic material. The use of ring seals makes it possible to insert the unit along the axis into the plastic and to lock said unit very quickly by means of a clip, for example composed of steel wire.

DE 10 2004 045 016 A1 discloses a heat exchanger, in particular exhaust-gas heat exchanger of an internal combustion engine of a motor vehicle, having a housing casing which is open at both sides. The housing casing is composed of a material which is not heat resistant at least at a temperature at which the first medium enters into the heat exchanger. The housing casing is composed of plastic. A second plate is mounted in an axially movable, sealed fashion in the axially hollow housing casing. The sealed mounting is ensured by a first seal which is provided radially between said second tube plate and the housing casing. A second annular seal is provided at the outlet side of the heat exchanger.

It is an object of the present invention to improve a heat exchanger of the type specified in the introduction.

Said object is achieved by means of the features of the embodiments described herein.

It is provided according to the invention that a heat exchanger, in particular an exhaust-gas heat exchanger, has a housing through which a first medium and at least one second medium can flow. The heat exchanger has at least one sealing element which comes into contact at least in sections with the second medium.

The first medium is in particular hot exhaust gas. The second medium is in particular a coolant such as for example a cooling liquid. The sealing element is cooled as a result of the contact at least in sections of the second medium, in particular of the coolant, with the sealing element. Here, a section of the sealing element is in particular flow-connected to at least one housing interior of the housing, such that the sealing element can be cooled by the second medium, in particular by the coolant, for example water or some other liquid coolant. The sealing element is formed in particular from a material which is heat-resistant only to a limited extent. Sealing elements such as O-rings or other sealing materials are usually formed from plastic, in particular rubber. Plastic and rubber materials are heat-resistant to a limited extent. When a certain temperature is exceeded, which is individual for each plastic, the material breaks down and the seal no longer fulfils its function. This must be prevented. Since in particular the hot exhaust gas can flow through the housing, sufficient cooling of the sealing element must be ensured. The cooling of the sealing element takes place in that the second medium, in particular the coolant, comes into contact with the sealing element at least in sections.

Furthermore, according to the invention, an improvement of the exchange of heat of the second medium is obtained by the flow means, with the flow means conducting the second medium in an improved fashion in critical regions in terms of flow dynamics or also permitting an improved absorption of heat from certain regions by virtue of the flow means providing an enlarged surface in the region of contact with the second medium. It is also possible for flow means of said type to obtain a more homogeneous distribution of the cooling power within the housing in order to optimize the flow of the second medium, such that in particular no local overheating occurs with the risk of local boiling of the second medium.

In one preferred embodiment, the sealing element is in contact at least in sections with the second medium, in order to prevent a destructive introduction of heat into the sealing element.

In one advantageous embodiment, the flow means comprises a molded portion which projects into the second medium from a wall of a tube which conducts the first medium. In this way, it is possible to generate turbulence of the second medium in the direct vicinity of the tube wall, which turbulence promotes the exchange of heat. Here, in one expedient embodiment detail, the molded portion is embodied as a structured portion of the wall of the tube, in particular as an embossed portion. Alternatively or in addition, the molded portion can also comprise a rib element. Rib elements of said type can for example, during the course of pre-assembly, be inserted between adjacent tubes of a tube bundle which is welded into plates, and welded or soldered to the tubes.

In a further advantageous embodiment, the molded portion comprises a housing duct which conducts the second medium and which leads from a connection region of the housing to an aperture region. In this way, the second medium can be introduced in a targeted fashion into a desired region of the housing interior, with it being possible in particular for the position of the external connections for coolant supply lines to meet other requirements, for example for optimizing the installation space. In one advantageous embodiment detail, the housing duct is formed here within a wall of the housing, with the housing duct and the housing particularly preferably being formed as a single-piece plastic molded part. This permits cost-effective production with a simultaneously installation-space-optimized arrangement of the housing duct.

In an alternative or additional embodiment, the housing duct leads at least in sections along a sealing element, as a result of which the cooling of the sealing element is promoted in a favorable way. The sealing element is particularly effectively protected from overheating if, in one advantageous embodiment, the sealing element is in direct contact with the second medium by means of the housing duct.

In a further alternative or additional embodiment of a flow means according to the invention, the flow means comprises a flared portion of a connection region for the second medium. In this way, an expansion of the supplied flow of the second medium, in particular also a swirling already in the region of the inlet, is obtained using simple means. One simple and expedient embodiment can provide here that the flared portion comprises an inclined wall section, with a geometric passage cross section for the second medium widening continuously by means of the inclined wall section. Alternatively or in addition, the flaring can however also take place in a stepped or alternately continuous and stepped fashion, depending on the desired optimization of the flow manipulation. The flared portion can also preferably be shaped asymmetrically with respect to a geometric inlet direction of the second medium. In this way, it is for example possible to obtain a change in the mean flow direction with respect to the geometric inlet direction, which leads, on account of the coolant connections which are usually situated in lateral regions of the housing, to an optimization of the flow profile of the second medium.

In a further alternative or additional embodiment of the invention, the flow means comprises a projection which is formed on a wall of the housing. Here, a passage cross section between the wall and a tube which conducts the first medium is advantageously reduced by the projection. By means of a projection of said type, it is possible for the flow of the second medium to be conducted through desired spatial regions of the housing and along desired flow paths using simple means, such that the exchanger power is optimized.

In a further alternative or additional embodiment of the invention, the sealing element is arranged between the housing and a plate, which is composed in particular of metal, of the heat exchanger, with the flow means comprising a thermally conductive molded portion, which is arranged in the vicinity of the seal, of the plate. Here, a surface, which is in contact with the second medium, of a region of the plate which is adjacent to the sealing element is advantageously enlarged by the molded portion. Overall, with a flow means designed in this way, a locally improved dissipation of heat from the plate into the second medium is obtained within the context of the invention, such that the seal, which is critical with regard to a destructive introduction of heat from the plate, is protected.

In one possible embodiment detail, the molded portion of the plate comprises a metal part, in particular a sheet metal molded part, which is connected in a thermally conductive manner to the plate. In this way, it is possible to obtain a particularly great local improvement in the heat dissipation from the plate.

In an alternative or additional embodiment, the molded portion is formed in one piece with the plate, as a result of which the molded portion can be produced in a particularly simple manner for example by means of local deformation of the plate. Here, in one exemplary embodiment detail, the molded portion comprises at least one formed-in channel, which projects in particular into the second medium, of the plate. In the interests of simple and cost-effective production overall, the plate is formed as a sheet metal molded part, with the molded portion being formed as a multiple bend of the sheet metal molded part in the vicinity of the sealing element.

In one advantageous embodiment detail, it is provided that a heat exchanger, in particular an exhaust-gas heat exchanger, has a housing through which a first medium and at least one second medium can flow. The heat exchanger has at least one sealing element which comes into contact at least in sections with the second medium.

The first medium is in particular hot exhaust gas. The second medium is in particular a coolant such as for example a cooling liquid. The sealing element is cooled as a result of the contact at least in sections of the second medium, in particular of the coolant, with the sealing element. Here, a section of the sealing element is in particular flow-connected to at least one housing interior of the housing, such that the sealing element can be cooled by the second medium, in particular by the coolant, for example water or some other liquid coolant. The sealing element is formed in particular from a material which is heat-resistant only to a limited extent. Sealing elements such as O-rings or other sealing materials are usually formed from plastic, in particular rubber. Plastic and rubber materials are heat-resistant to a limited extent. When a certain temperature is exceeded, which is individual for each plastic, the material breaks down and the seal no longer fulfils its function. This must be prevented. Since in particular the hot exhaust gas can flow through the housing, sufficient cooling of the sealing element must be ensured. The cooling of the sealing element takes place in that the second medium, in particular the coolant, comes into contact with the sealing element at least in sections.

In one advantageous refinement of the invention, the housing is formed from a material which is only heat-resistant to a limited extent. The housing can thereby particularly advantageously be produced in a cost-effective manner.

In a further advantageous embodiment, the housing is formed from plastic. The housing thereby has in particular a low weight and can be produced in a particularly cost-effective manner.

In one advantageous embodiment of the invention, the heat exchanger has a groove into which a sealing element can be inserted. An O-ring in particular can be inserted into the groove. In a further embodiment, sealing material can be inserted into the groove, for example by means of a pistol with which the sealing material such as plastic, rubber etc. can be inserted.

In a further advantageous embodiment of the invention, at least one connecting pipe and/or at least one connecting flange and/or at least one fastening element are formed in one piece with the housing. In this way, a plurality of components can particularly advantageously be produced in one production process.

Necessary joining operations are dispensed with, as a result of which the heat exchanger can be produced in a particularly cost-effective manner.

In a further advantageous embodiment of the invention, the groove of the heat exchanger is flow-connected to a housing interior space. In this way, the groove and in particular the sealing element which can be introduced can particularly advantageously be traversed by the second medium, in particular the coolant, from the housing interior space.

In one advantageous refinement of the invention, the housing has at least one first flow duct through which the second medium, in particular the coolant, can flow. By means of said design, it is particularly advantageously possible for installation space to be saved, since in particular the supply and/or discharge of the second medium takes place through the housing.

In one advantageous refinement of the invention, the housing has at least one second flow duct through which the second medium, in particular the coolant, can flow. Said second flow duct particularly advantageously supplies the second medium, in particular the coolant, to the sealing element and/or to the groove, as a result of which the sealing element can be particularly advantageously cooled.

In a further embodiment of the invention, the first flow duct and the second flow duct are flow-connected. The second medium can particularly advantageously be supplied via the first flow duct and the second flow duct to the sealing element and/or to the groove. The sealing element can be particularly advantageously cooled in this way.

In a further advantageous embodiment of the invention, a flow guiding element has at least one guide element. The flow guiding element particularly advantageously conducts the first medium, in particular the exhaust gas, in a U-shaped flow into an in particular different flow direction. In this way, the first medium, the exhaust gas, can in particular be conducted in a U-shaped flow through the housing. The flow guiding element can particularly advantageously be connected to the housing by means of the guide element. The first medium, in particular the exhaust gas, can also be cooled in an I-shaped flow in a co-current flow or in a countercurrent flow. In the case of the I-shaped flow, the housing has two openings for the exhaust gas, an inlet opening and an outlet opening.

In a further advantageous embodiment of the invention, the housing has at least one mating guide element which can in particular be connected in a form-fitting manner to the guide element, in particular the flow guiding element. A vibration of the flow guiding element and of the tubes of the heat exchanger can be particularly advantageously prevented in this way.

In a further advantageous embodiment of the invention, the heat exchanger can be traversed by the first medium, in particular the exhaust gas, in a U-shaped flow or an I-shaped flow. The installation space of the heat exchanger can particularly advantageously be reduced in the case of the U-shaped flow, since the supply and the discharge of the first medium can take place on one side of the heat exchanger. Furthermore, the exchange of heat between the uncooled first medium and the cooled first medium particularly advantageously takes place in a counterflow principle.

In one advantageous refinement of the invention, the heat exchanger has at least one bypass. The first medium, in particular the exhaust gas, can particularly advantageously be discharged uncooled during the starting phase of internal combustion engine operation and/or during a further phase of internal combustion engine operation.

In a further advantageous embodiment of the invention, the heat exchanger has at least one bypass flap. Uncooled first medium, in particular exhaust gas, can particularly advantageously be supplied to a heat exchanger and/or to a bypass. The proportion of the first medium which can be supplied to the heat exchanger and the proportion of the first medium which can be supplied to the bypass can in particular be adjusted in any desired way.

Also proposed is a heat exchanger which has a first opening and at least one second opening, with it being possible for the heat exchanger to be traversed in an I-shaped flow, with the housing of the heat exchanger in particular having one first opening and one second opening. Here, the first medium enters through the first opening into the heat exchanger, in particular into the housing, flows through the heat exchanger and leaves the heat exchanger through the second opening.

In another embodiment (not illustrated), the first medium enters through the second opening into the heat exchanger, flows through the latter and leaves the heat exchanger through the first opening.

In a further advantageous embodiment, a second sealing element can be inserted into a second groove, with the second sealing element coming into contact at least in sections with the second medium. Here, the second medium can particularly advantageously flow around the second sealing element; the second medium can in particular be particularly advantageously cooled.

In one advantageous refinement, a first plate can be connected, in particular in a form-fitting and/or cohesive fashion, at least in sections to the housing and/or a second plate can be connected, in particular in a form-fitting and/or cohesive fashion, at least in sections to the housing. The plate can particularly advantageously be connected to the housing in a form-fitting manner, in particular by means of a bolt-nut connection etc.

In a further advantageous embodiment, a second plate can be connected, in particular in a form-fitting and/or cohesive fashion, at least in sections to the housing. The second plate can particularly advantageously be connected to the housing in a form-fitting manner, in particular by means of a bolt-nut connection etc.

In a further advantageous embodiment, the first plate has at least one tube passage opening for holding at least one tube, in particular a number of first tube passage openings for holding a number of tubes. In one advantageous embodiment, the second plate has at least one second tube passage opening for holding at least one tube, in particular a number of second tube passage openings for holding a number of tubes.

In one advantageous embodiment, first tube end sections of the tubes can be connected in a form-fitting and/or cohesive fashion to the first plate. The first tube end sections can particularly advantageously be flareable. The first plate can be particularly advantageously connected to the tubes in this way.

In a further advantageous embodiment, second tube end sections of the tubes can be connected in a form-fitting and/or cohesive fashion to the second plate. The second tube end sections can particularly advantageously be flareable. The second plate can be particularly advantageously connected to the tubes in this way.

According to the invention, a method for producing a heat exchanger is provided, with at least one connecting pipe, at least one connecting flange and at least one fastening element being formed in one piece with the housing, and in particular with the housing, the at least one connecting pipe, the at least one connecting flange and the at least one fastening element being produced by injection molding. In this way, complex housing shapes can be produced in a particularly advantageous and cost-effective manner. Joining operations for joining possible add-on parts to the housing, in particular for joining the connecting pipe, the connecting flange and the fastening elements to the housing, are dispensed with.

According to the invention, a method for producing a heat exchanger is provided, with the first flow duct and/or the second flow duct being produced by means of injection molding, in particular using a gas internal pressure process. In said process, a gas, in particular nitrogen, is supplied to the housing during the injection-molding process in order to generate a cavity, in particular a flow duct, in the housing. The cavity can likewise be produced using some other method, for example using a mandrel. The inflow and/or outflow duct for the second medium, in particular the coolant, can be particularly advantageously formed in the housing in this way. The installation space can also particularly advantageously be reduced.

According to the invention, a method for producing a heat exchanger is provided in which at least three elements of the heat exchanger, in particular the housing, the bypass flap and the plate, are assembled in one assembly operation, in particular in one screwing operation. The assembly expenditure and the assembly costs are particularly advantageously reduced.

A method for producing a heat exchanger is also proposed which is characterized by the following steps:

The tubes are inserted flush into the first plate, in particular into at least one opening of the plate, and in particular such that the first tube end sections end flush with the plate. The first tube end sections are connected in particular in a form-fitting and/or cohesive fashion to the first plate. The tubes which are connected to the first plate are inserted flush into the housing. The tubes can, after having been inserted into the first plate, be connected in a form-fitting fashion in the section of the first tube end sections by means of flaring. The modular unit generated in this way can be inserted into the housing.

In one advantageous refinement, the second tube end sections are inserted flush into the second plate, in particular into at least one opening of the second plate, with the first plate subsequently being cohesively connected, in particular by means of welding, soldering, adhesive bonding etc., to the first tube end sections while the first plate is cooled, and/or the second plate being cohesively connected, in particular by means of welding, soldering, adhesive bonding etc., to the second tube end sections while the second plate is cooled. The plate is particularly advantageously cooled during the cohesive joining process, in particular during the welding process, by means of a device by virtue of the device particularly advantageously being in contact at least in sections with the first plate and thereby cooling the latter. The second plate is cooled during the cohesive joining process, in particular during the welding process, by means of a device which is in contact at least in sections with the second plate.

In one advantageous refinement, the first plate and/or the second plate are connected to the housing.

Also proposed is a method for producing a heat exchanger which is characterized by the following steps:

The tubes are inserted into the first and second plate. The first tube end sections are connected in particular in a form-fitting and/or cohesive fashion to the first plate, and the second tube end sections are connected in particular in a form-fitting and/or cohesive fashion to the second plate. The tubes which are connected to the first and to the second plate are inserted into the housing. The diffuser, in particular the outlet diffuser, is connected to the second plate in a cohesive fashion, in particular by means of welding, soldering, adhesive bonding etc., in such a way that the second sealing element and the diffuser are in contact at least in sections. The tubes, after having been inserted into the first and the second plate, are particularly advantageously connected, in the sections of the first tube end sections, in a form-fitting manner to the first plate and, in the sections of the second tube end sections, in a form-fitting manner to the second plate, by virtue of the first tube end sections and the second tube end sections being flared. The first tube end sections are particularly advantageously then connected to the first plate in a cohesive fashion, in particular by means of welding, soldering, adhesive bonding etc. The second tube end sections are particularly advantageously then connected to the second plate in a cohesive fashion, in particular by means of welding, soldering, adhesive bonding etc.

The modular unit which is generated in this way can particularly advantageously be inserted into the housing in one working step. The diffuser, in particular the outlet diffuser, is particularly advantageously connected to the second plate in a cohesive fashion, in particular by means of welding. As the diffuser which is connected to the second plate is inserted into the housing, the modular unit which is generated is inserted into the housing in such a way that, after the insertion of the modular unit into the housing, the diffuser is in contact at least in sections with a second sealing element which could previously be inserted into the housing. A sealed connection between the diffuser and the housing can particularly advantageously be produced in this way.

In a further advantageous embodiment, the first medium is conducted in a tube bundle, with the flow means comprising a guiding element which is arranged on the tube bundle and which projects at least partially into an intermediate space between the tube bundle and the housing. In this way, a spacing between the tube bundle and housing is reduced in size, such that the second medium is forced to flow primarily through the tube bundle or the intermediate spaces between adjacent tubes of the tube bundle. In this way, for a given overall mass flow of the second medium, the exchange of heat with the tube walls is improved. The guiding element can fundamentally also be in contact with the housing, wherein with a corresponding construction of the guiding element for example from a thin metal sheet, there is a sufficiently low conduction of heat from the tubes to the housing wall that the housing can be produced from plastic even when the first medium is at high temperatures (example: exhaust-gas cooler).

In one preferred embodiment detail, the guiding element is formed substantially as a sheet-metal molded part, in particular from a high-grade steel. In this way, direct contact with the tube bundle is permitted even in the case of very high temperatures of the first medium.

In one expedient embodiment, the guiding element is formed as a frame which substantially completely surrounds the tube bundle. Said frame can then be easily pushed over the tube bundle during the assembly of the tube bundle, and ensures a reduction of the spacing to the housing wall over the entire periphery.

In the interests of cost-effective production and simple assembly, the guiding element has at least one resiliently elastic member, with the guiding element being held in a clamped and/or form-fitting manner on the tube bundle by means of the resiliently elastic member. In addition to simple assembly, a clamped, in particular non-cohesive connection also ensures a relatively poor transfer of heat between the tube wall and the guiding element, which is advantageous in the event of the guiding element being in contact with the housing which is composed in particular of plastic.

The tube bundle can advantageously be inserted, together with the guiding element fixed thereto, into the housing, in order to permit modular and fast assembly. Here, the guiding element is particularly preferably movable in a resiliently elastic fashion at least in one movement direction of the insertion of the tube bundle into the housing in order to give way to any projections of the housing during the course of the insertion.

For a particularly advantageous optimization of the flow of the second medium through the intermediate spaces between adjacent tubes of the tube bundle, a spacing which remains between the guiding element and a wall of the housing is not significantly larger than a spacing between adjacent tubes of the tube bundle. In this way, it is ensured that at least a predominant part of the second medium flows between the tubes and not between the housing wall and the tube bundle.

Further advantageous embodiments can be gathered from the subclaims.

Exemplary embodiments of the invention are illustrated in the drawings and are explained in more detail below.

Figure 2:
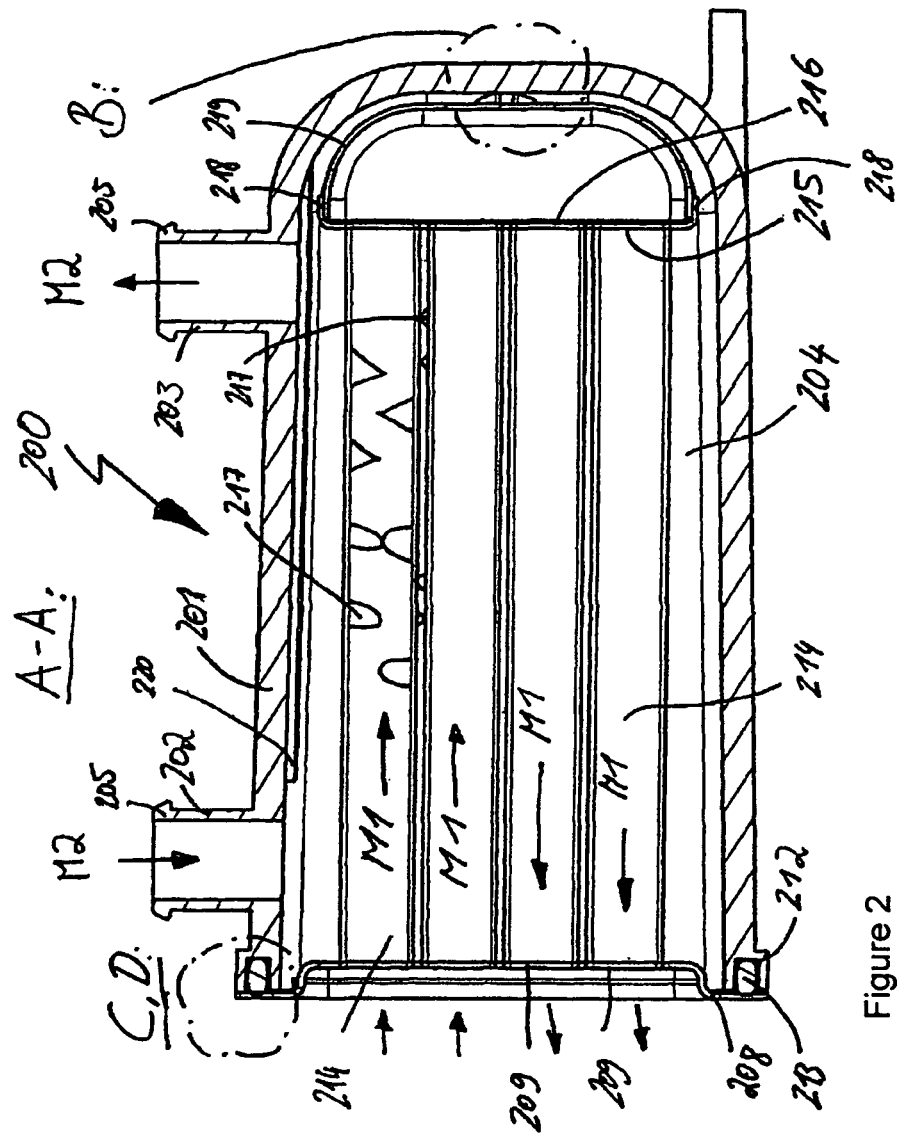
Figure 3:
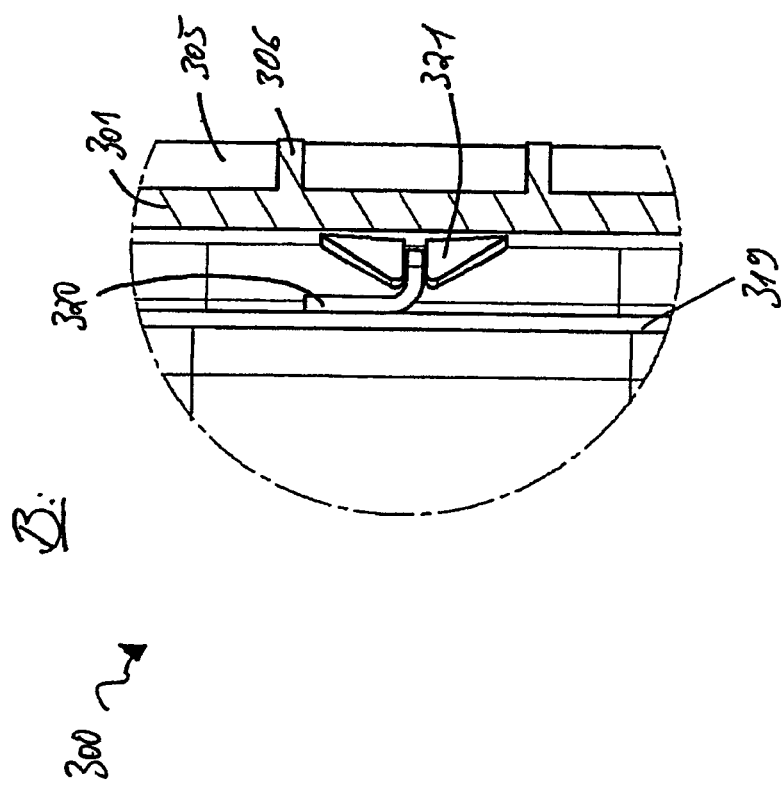
Figure 8:
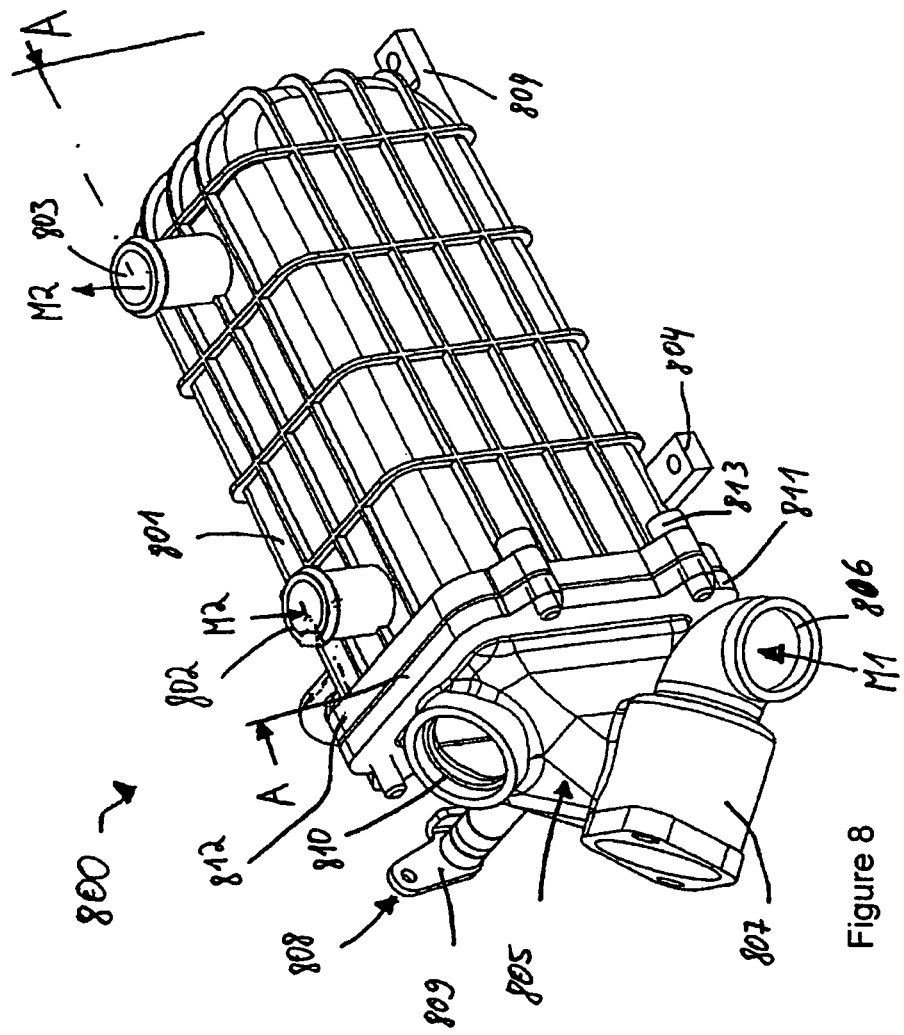
Figure 9:
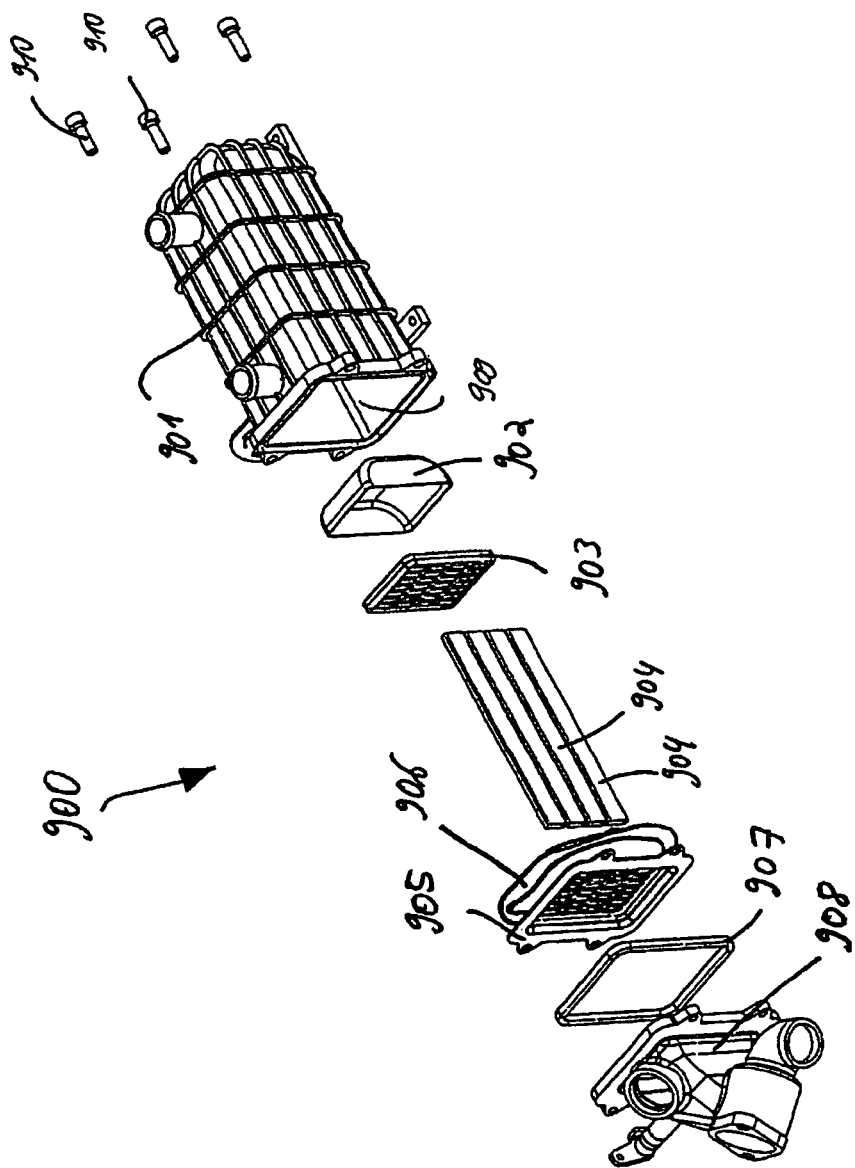
Figures 12, 13:
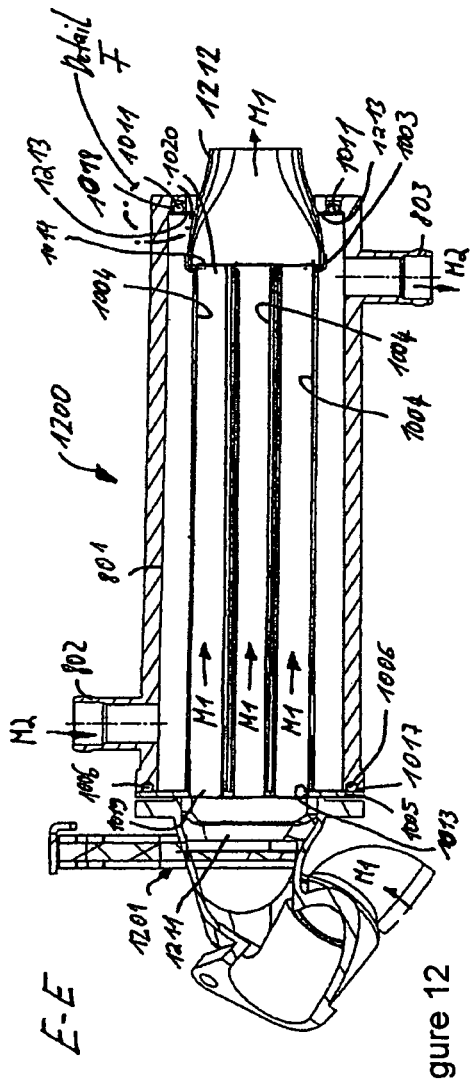
Figure 14:
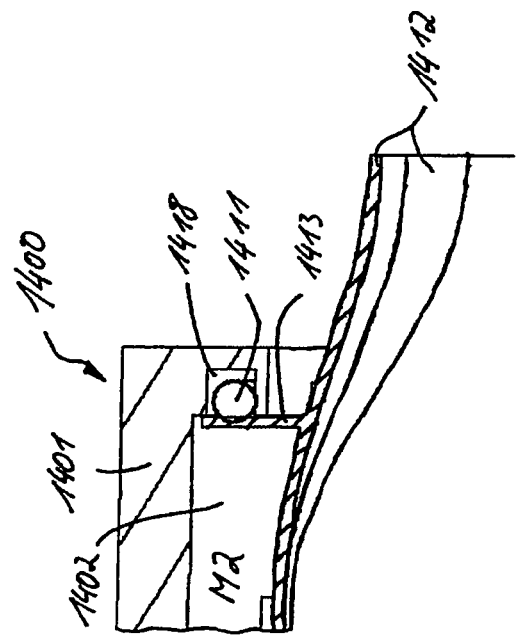
Figure 15:
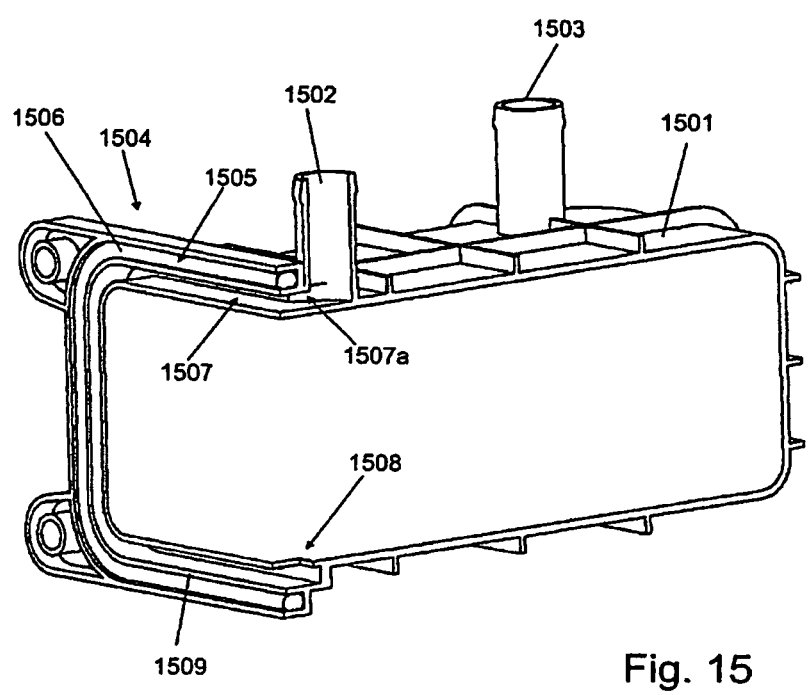
Figure 16:
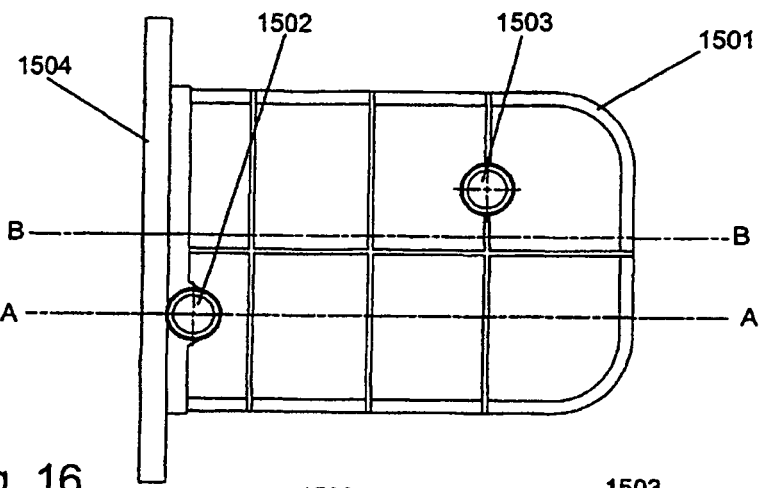
Figure 17:
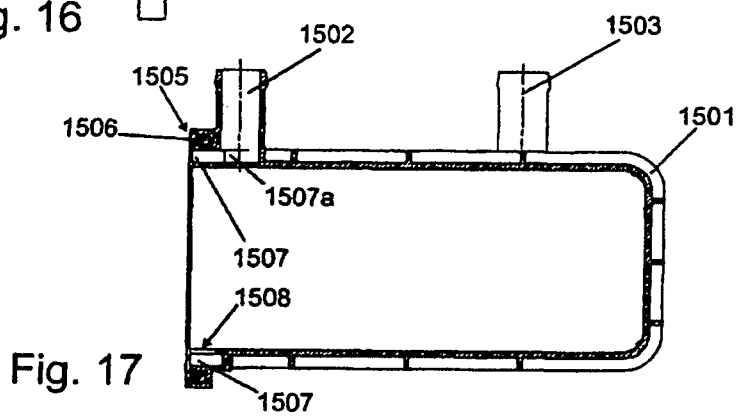
Figure 18:
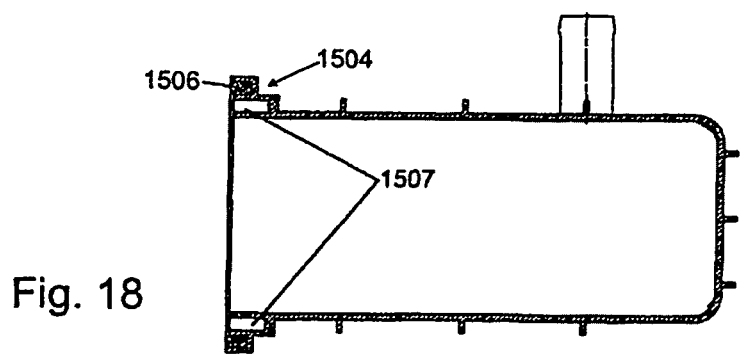
Figure 19:
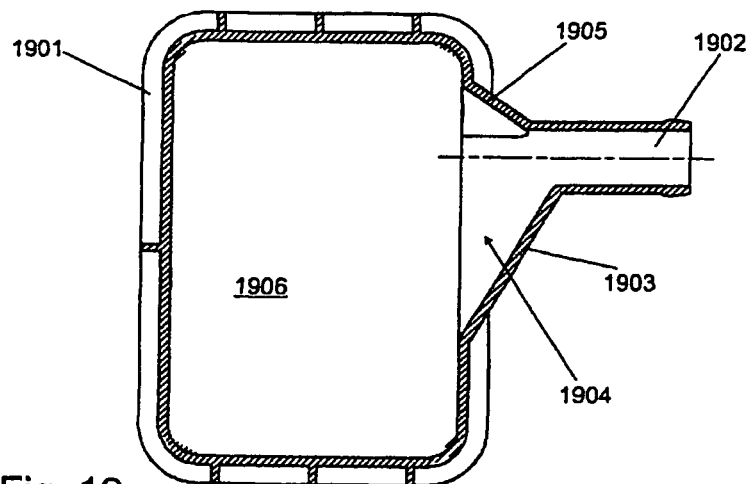
Figure 20:
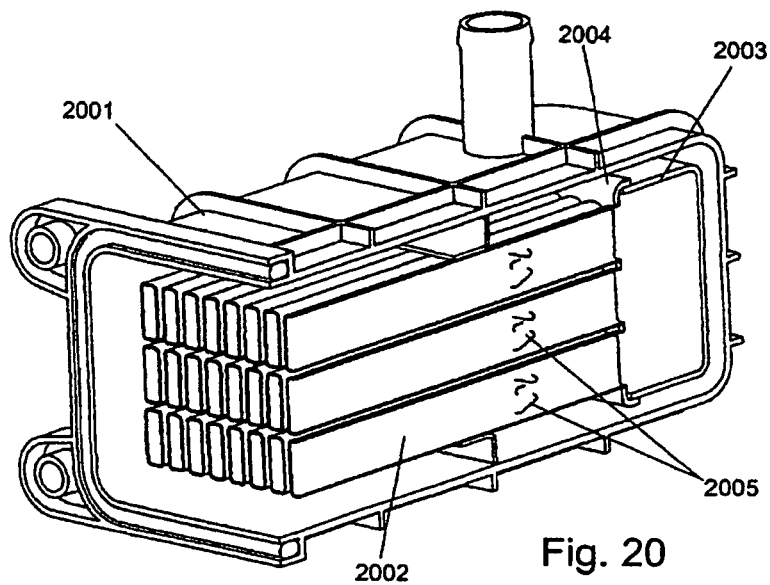
Figure 21:
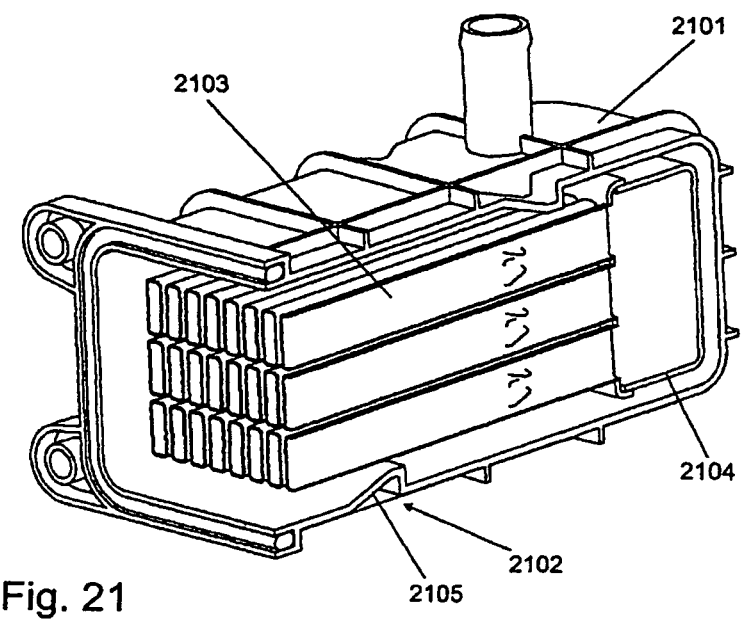
Figure 22:
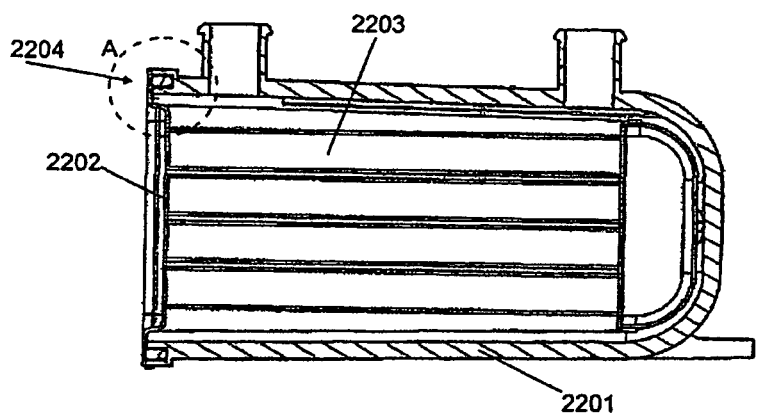
Figure 23:
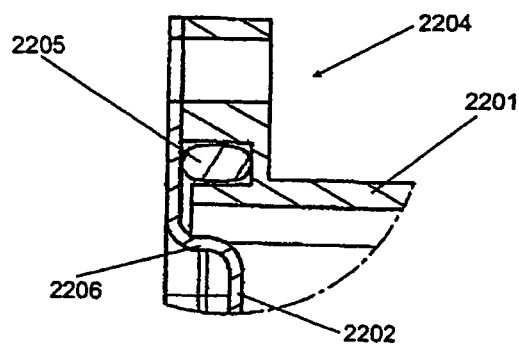
Figure 24:
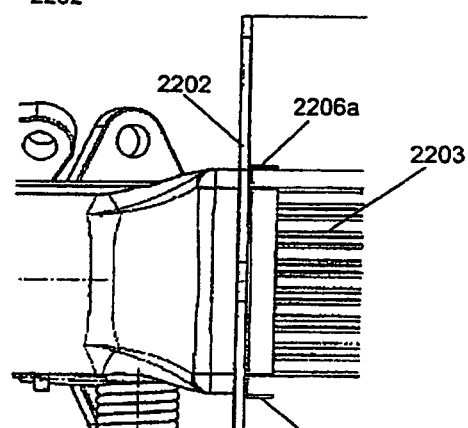
Figure 25:
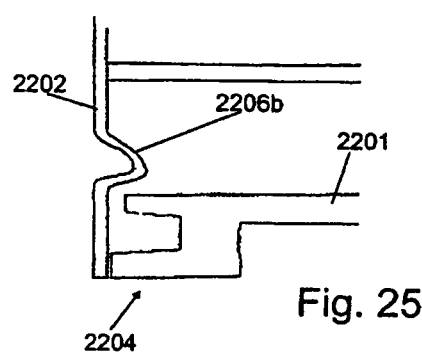
Figure 26:
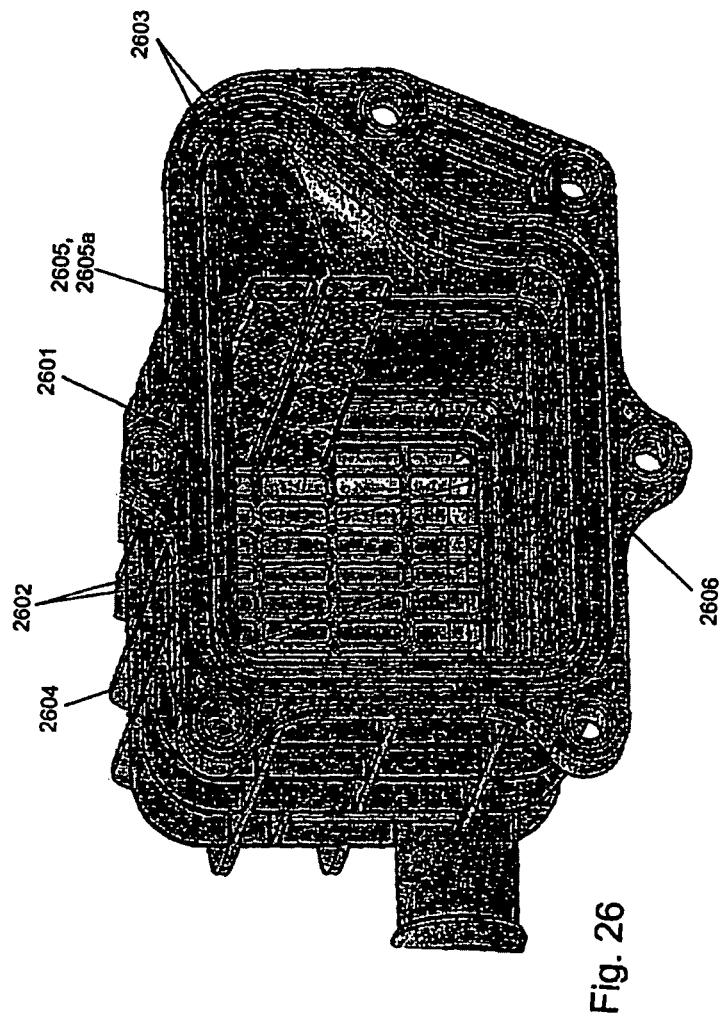
Figure 27:
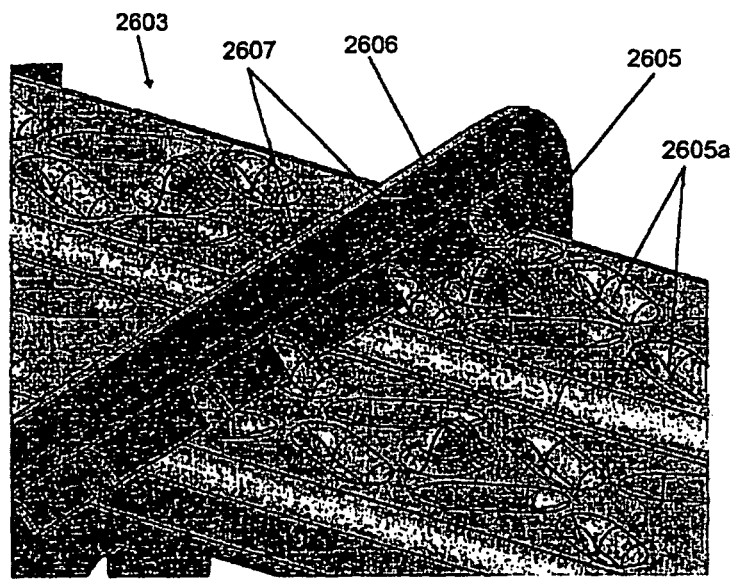
Figure 28:
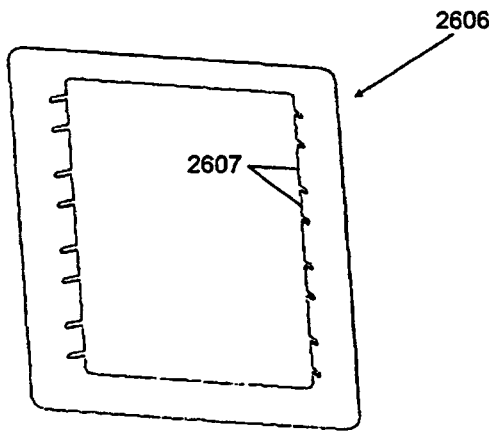

In the drawings:

FIG. 1: shows an isometric illustration of a heat exchanger,

FIG. 2: shows a section A-A through the heat exchanger,

FIG. 3: shows a detail B of the heat exchanger,

FIG. 4: shows a further embodiment of the housing of a heat exchanger,

FIG. 5: shows a further embodiment of the housing of a heat exchanger,

FIG. 6: shows a detail C of the housing of a heat exchanger,

FIG. 7: shows a detail C of a further embodiment of the housing of a heat exchanger, FIG. 8: shows an isometric illustration of a heat exchanger having a bypass flap and FIG. 9: shows an exploded illustration of a heat exchanger having a bypass flap, FIG. 10: shows a section D-D through the heat exchanger which can be traversed in an I-shaped flow, FIG. 11: shows an isometric illustration of a heat exchanger which can be traversed in an I-shaped flow and has a bypass tube, FIG. 12: shows a section E-E through a heat exchanger which can be traversed in an I-shaped flow and has an EGR valve and/or bypass valve, FIG. 13: shows a plan view of a heat exchanger which can be traversed in an I-shaped flow and has an EGR valve and/or bypass valve, FIG. 14: shows a detail illustration F of the second seal section, FIG. 15: shows a three-dimensional section view of a further embodiment of a heat exchanger, FIG. 16: shows a plan view of the heat exchanger from FIG. 15 from above, FIG. 17: shows a planar section view of the heat exchanger from FIG. 16 along the line A-A, FIG. 18: shows a planar section view of the heat exchanger from FIG. 16 along the line B-B, FIG. 19 shows a section view of a further exemplary embodiment of a heat exchanger, FIG. 20 shows a three-dimensional section view of a further exemplary embodiment of a heat exchanger, FIG. 21 shows a three-dimensional section view of a further exemplary embodiment of a heat exchanger, FIG. 22 shows a side view of a further exemplary embodiment of a heat exchanger, FIG. 23 shows an enlarged detail of the region A from FIG. 22, FIG. 24 shows a schematic partial section view of a further exemplary embodiment of a heat exchanger, FIG. 25 shows a schematic partial section view of a further exemplary embodiment of a heat exchanger, FIG. 26 shows a three-dimensional partial illustration of a further exemplary embodiment of a heat exchanger according to the invention, FIG. 27 shows a three-dimensional detail illustration of a part of the heat exchanger from FIG. 26, and FIG. 28 shows a schematic three-dimensional illustration of a guiding element of the heat exchanger from FIG. 26 and FIG. 27.

FIG. 1 shows an isometric illustration of a heat exchanger. The heat exchanger 100 has a housing 101, a supply pipe 102, a discharge pipe 103 and a fastening element 104.

The second medium M2, in particular the coolant, is supplied to the housing via the supply pipe 102 and is discharged from the housing 101 again via the discharge pipe 103.

The housing 101 is formed from a material which is heat-resistant to a limited extent, in particular plastic.

The supply pipe 102, the discharge pipe 103 and the fastening element 104 are formed in one piece with the housing 101, in particular by means of injection molding of a plastic. First stiffening struts 105 and second stiffening struts 106 are formed out of the housing 101. The stiffening struts 105, 106 are in particular formed in one piece with the housing 101. The first stiffening struts 105 are arranged substantially parallel to one another. The second stiffening struts 106 are likewise arranged substantially parallel. The first stiffening struts 105 enclose substantially an angle α of 90° with the second stiffening struts 106.

In a further embodiment of the invention which is not illustrated, the angle α assumes values of 0-90°. A bore is formed in the fastening element. The heat exchanger 100 can be assembled on another component (not illustrated) by means of said bore. The heat exchanger 100 has at least one plate 108. The plate has a number of tube openings 109. The tube openings 109 are formed substantially as oval slots. In particular, tubes, winglet tubes (not illustrated), are inserted into the tube openings 109 and are connected to the plate 108 in a cohesive fashion, in particular by means of soldering, welding, adhesive bonding etc. The tube openings 109 are arranged in a number of tube opening rows, with the tube opening rows being arranged substantially parallel to one another.

The plate 108 is of substantially square design with rounded corners. In another embodiment (not illustrated), the plate has a round, an oval or some other shape. A number of tongues 111 are formed out of the plate, which tongues 111 are arranged substantially parallel in the direction of the first stiffening struts 105 and in the direction of the second stiffening struts 106. By means of a flanging process, in particular by means of corrugated slot flanging, the tongues are shaped such that they are connected in a form-fitting fashion to a collar (not visible) of the housing 101.

FIG. 2 shows a section A-A of the heat exchanger 200. The second medium, in particular the coolant, is supplied via a supply pipe to the housing interior 204 and is discharged out of the housing 204 again via the discharge pipe 203.

In another embodiment (not illustrated) the pipe 203 forms the supply pipe and the pipe 202 forms the discharge pipe. The pipe 202 and the pipe 203 are arranged on one side of the housing.

In another embodiment (not illustrated), the supply pipe and the discharge pipe are arranged on different housing sides. The supply pipe 202 and the discharge pipe 203 have a lug 205 which is in particular of encircling design. The lug 205 forms a latching element which latches in particular into the opening region of an inflow and/or outflow tube for the second medium M2 and can be connected in a form-fitting manner thereto. The plate 208 can be produced in particular by means of a shaping process, in particular by means of punching and/or embossing. The plate 208 has a number of openings 209. Said plate is connected into the housing 201 in a form-fitting manner, in particular by means of bolts.

In another embodiment, the plate is connected to the housing 201 by means of a deformation process, for example flanging, in particular corrugated slot flanging.

A cutout, for example a groove 212, is formed, in particular in an encircling fashion, into the housing 201. The groove 212 can be formed during the production process of the housing, in particular during the injection-molding process. A sealing element 213 can be inserted into the groove 212. The sealing element 213 is a rubber element, in particular an O-ring.

In another embodiment (not illustrated), the sealing element 213 is formed by inserting, in particular injecting, a sealing material into the groove 212. A number of tubes 214, composed in particular of steel, preferably of high-grade steel, are inserted and arranged in the housing interior 204 such that adjacent tubes 214 are arranged substantially parallel to one another and in the direction of the flow profile of the first medium M1, in particular of the exhaust gas. In other embodiments, other materials in addition to high-grade steel can also be used for the tubes 214. The tubes 214 are formed in particular as winglet tubes. The tubes 214 have turbulence generators 217 which are formed, in particular by means of a deforming production process such as for example punching or embossing, from the tube wall into the tube interior and/or from the tube wall outward in the direction of an adjacent tube 214. The turbulence generators improve in particular the exchange of heat and/or the transfer of heat between the first medium M1 and the second medium M2. The turbulence generators 217 additionally support adjacent tubes 214 against one another and/or ensure the spacing between adjacent tubes 214.

The turbulence generators 217 are flow means within the context of the invention. This applies in particular to those turbulence generators 217 which project from the walls of the tubes 214 into the second medium M2.

The tubes 214 are held by the openings 209 in the plate 208 and by the openings 216 of the receptacle 215 in the plate 208 and in the receptacle 215 and are in particular connected to the plate 208 and to the receptacle 215 in a cohesive fashion, in particular by means of welding, soldering, adhesive bonding etc., and/or in a form-fitting fashion. The receptacle 215 is of substantially rectangular design and has at least one receptacle end 218 which is bent in particular by deformation and which encloses an angle (not illustrated) of substantially 90° with the receptacle. In another embodiment (not illustrated), the angle (not shown) assumes values of 0 to 90°.

A flow guiding element 219 is inserted into the housing interior 201. The flow guiding element 219 is of substantially shell-shaped design and deflects the flow direction of the first medium M1 by substantially 180°. In another embodiment, the flow element causes a change in direction of the exhaust gas by an angle of 0° to 180°. The flow guiding element is connected to the receptacle 215 in a cohesive fashion by means of welding, soldering, adhesive bonding etc. and/or in a form-fitting fashion.

In the upper region of the housing 201, at the side at which the supply pipe 202 and the discharge pipe 203 are formed, a housing web 220 is formed out of the housing in the direction of the housing interior 204. The housing web forms a stop for a flow build-up element (not illustrated) which brings about in particular the flow of the second medium M2 through the front tube region of the tubes 214.

The flow build-up element (not illustrated) is a flow means within the context of the invention.

FIG. 3 shows a detail B of a heat exchanger 300. The heat exchanger 300 has a housing 301, first stiffening struts 305 and second stiffening struts 306. The flow guiding element 319 is connected to a guide 320 in particular in a cohesive fashion by means of welding, soldering, adhesive bonding etc. and/or in a form-fitting fashion. The guide 320 is in particular a tongue which engages into a mating guide element 321 and which is connected to the latter in particular in a form-fitting fashion. The mating guide element 321 is formed out of the housing 301, in particular in one piece. In another embodiment, the mating guide element 321 can be formed with the housing 301 in particular in a cohesive fashion.

FIG. 4 shows a housing detail 401 of the heat exchanger 400. The housing 401 has at least one first flow duct 402 which is formed into the housing in particular during the injection molding of the housing, in particular by means of a gas internal pressure process. The second medium M2 flows through the first flow duct 402 into the housing interior 403. A part of the second medium M2 flows via a third flow duct 405 into the groove 404 which is formed into the housing, in particular during the injection molding process. A sealing element (not illustrated) can be inserted into the groove 404. The sealing is particularly advantageously cooled by means of the flow of the second medium M2 which passes to the sealing element (not illustrated) via the third flow duct 405. The housing 401 is formed from plastic. In another exemplary embodiment (not illustrated), the housing 401 can be formed from some other material.

FIG. 5 shows a further embodiment of a housing 501 of a heat exchanger 500. The housing 501 has a first flow duct 502 which is formed into the housing 501 in particular during the injection-molding process, in particular of the plastic. Furthermore, the housing 501 comprises a second flow duct 503 which is formed in the housing 501 and which is flow-connected to the first flow duct 501. The second flow duct 503 is likewise flow-connected to the housing interior 504. The housing, the second flow duct 503 and the housing interior 504 can be traversed by the second medium M2, in particular the coolant, via the first flow duct 502. The housing 506 has a third flow duct which is flow-connected to the groove 505. The second medium M2 can in this way flow into the groove 505 and particularly advantageously cool a sealing element (not illustrated) which can be inserted into the groove 505.

The flow ducts 402, 405, 502, 503, 505 described with regard to FIG. 4 and FIG. 5 are in each case flow means within the context of the invention. Each of the ducts ensures targeted transport of the second medium M2 within the housing, so that at least spatial partial region such as for example the sealing element and its groove is cooled in an improved fashion.

FIG. 6 shows a detail C of the housing 601 of a heat exchanger 600. The housing 601 has at least one flange opening 602 and at least one groove 606. The flange opening 602 and/or the groove 606 can be formed into the housing 601 in particular during the injection molding of the housing 601. The flange opening 602 is formed as a passage bore. The groove 606 is formed as a rectangular groove. Said groove 606 can however also be of V-shaped design or can have some other cross-sectional shape. The groove 606 is in particular formed in an encircling fashion on the housing 601.

Via a third flow duct 605, the groove 606 and a sealing element 607, in particular an O-ring, which can be inserted into the groove can be traversed by the second medium M2, the coolant, and come into contact with the latter. The sealing element 607 can particularly advantageously be cooled by the medium M2.

FIG. 7 shows a detail of a heat exchanger 700 with a housing 702 and a plate 703. The housing 702 has a groove 706 and a housing interior 708. The housing interior 708 is flow-connected to the groove 706. A third flow duct 705 connects the housing interior 708 to the groove 706. The groove 706 and the sealing element 707 come into contact at least in sections with the second medium M2, in particular the coolant, and are traversed by the latter. The plate 703 has at least one plate end section 709 which engages at least in sections around the housing flange 710 and is connected to the latter in a form-fitting fashion, in particular by means of flanging, and/or in a cohesive fashion, in particular by means of welding, soldering, adhesive bonding etc.

The flow ducts 605, 705 described with regard to FIG. 6 and FIG. 7 are likewise flow means within the context of the invention. Each of the ducts provides targeted transport of the second medium M2 within the housing, in the present case to the sealing element 607, 707, so that the cooling of the latter is improved.

FIG. 8 shows an isometric illustration of a heat exchanger 800 having an inlet outlet diffuser 805. The housing has an inlet pipe 802 for the second medium M2 and an outlet pipe 803 for the second medium M2. In another embodiment (not illustrated), the inlet pipe 802 and the outlet pipe 803 can be exchanged. The housing also has fastening elements 804. A housing flange 812 is connected to the housing 801 via the diffuser flange 811 of the inlet outlet diffuser 805, in particular in a form-fitting fashion, to the housing by means of fastening elements 813, in particular by means of bolts.

The inlet outlet diffuser 805 is formed in the shape of a pyramid. It has a connection 806 for the first medium, in particular for the exhaust gas M1. Via the inlet 806, the first medium M1 passes to an EGR valve which controls and/or regulates the supplied quantity of the first medium M1, in particular of the exhaust gas. After the first medium M1 has passed the EGR valve 807, it passes, if a bypass flap (not illustrated) is open, through a plate (not illustrated) of the housing 801 into the interior of the housing 801. The first medium flows through the interior of the housing, in particular in a U-shaped flow, though it can also flow through the housing in an I-shaped flow and passes via an outlet 810 into an outlet line (not illustrated). A bypass flap 808 (not illustrated) can be adjusted by means of a lever 809 in such a way that the first medium M1 which is supplied via the inlet 806 is supplied to the housing and to the cooler 800 or passes directly via a bypass (not illustrated) to the outlet 810. Furthermore, the bypass flap 808 can also be adjusted in such a way that a part of the first medium M1 enters into the cooler 800 and a residual other part of the first medium M1 is supplied via the bypass directly to the outlet 810.

FIG. 9 shows an exploded illustration of the heat exchanger 900. The heat exchanger 900 comprises a housing 901. A flow guiding element 902 which is of shell-shaped design and which ensures in particular the U-shaped flow of the first medium M1 is connected to the receptacle 903 in particular in a cohesive fashion by means of welding, soldering, adhesive bonding etc. Tubes 904 are inserted into the receptacle 903 and into the plate 905 and are connected to the receptacle and/or to the plate in a cohesive fashion, in particular by means of welding, soldering, adhesive bonding etc., and/or in a form-fitting fashion. A first sealing element 906 seals off the plate 905 with respect to a housing flange (not shown in any more detail) of the housing 901. The first sealing element 906 is in particular inserted into the housing flange (not shown in any more detail). In a further embodiment, a second sealing element 907 seals off the plate 904 with respect to the inlet/outlet diffuser 908.

After the receptacle 903, the plate 905 and the tubes 904 have been connected in one joining step and the flow guiding element 902 has been connected to the receptacle 903, the first sealing element is placed into a groove (not shown in any more detail) of the housing flange of the housing 901 and the pre-joined or pre-assembled modular unit is assembled into the interior 909 of the housing 901.

Subsequently, in a further embodiment, a second sealing element 907 is placed between the plate 905 and the inlet outlet diffuser 908. The inlet outlet diffuser 908 is connected in a subsequent assembly process to the housing 901 by means of connecting elements 910, in particular bolts.

FIG. 10 shows a section D-D through a heat exchanger which is traversed by an I-shaped flow. Identical features are provided with the same reference symbols as in the preceding figures.

The heat exchanger 1000 has a housing 801 with a first opening 1015 and a second opening 1016. The housing 801 has a first groove 1017 in the region of the first opening 1015. A first sealing element 1006 is inserted into the first groove 1017. In the region of the second opening 1016, the housing 801 has a second groove 1018. A second sealing element 1011 is inserted into the second groove 1018. The second medium M2 can flow around the first sealing element 1006 at least in sections. The first sealing element 1006 is cooled in this way. The second sealing element 1011 can likewise be traversed at least in sections by the second medium, in particular the coolant. The second sealing element 1011 is particularly advantageously cooled in this way. The heat exchanger 1000 has a first plate 1005 with a number of first tube passage openings 1019. The heat exchanger 1000 also has a second plate 1003 with a number of second tube passage openings 1020. A number of tubes 1004 are arranged in the interior of the housing 801 substantially parallel to one another and parallel to the flow direction of the first medium M1. The tubes 1004 have first tube end section 1013 and second tube end sections 1014. The first tube end sections 1013 are in contact at least in sections with the first tube passage openings 1019 of the first plate 1005.

In the region of the first tube end sections 1013, the tubes 1004 are connected to the first plate 1005, in particular by means of welding, soldering, adhesive bonding etc., to the first plate 1005. The tubes 1004 are inserted into the first tube passage openings 1019 of the first plate 1005. Furthermore, the tubes 1004 are inserted, in the region of the second tube end sections 1014, into the second tube passage openings 1020 of the second plate 1003. The second tube end sections 1014 are connected to the second plate 1003 in a cohesive fashion, in particular by means of welding, soldering, adhesive bonding etc.

The first plate 1005 is in contact at least in sections with the first sealing element 1006. The first plate 1005 is connected to the housing 801 by means of a form-fitting connection (not illustrated) of the first plate 1005 to the housing 801 by means of connecting elements, in particular bolts and nuts. The first sealing element 1006 prevents the second medium M2 from emerging out of the interior of the housing 801.

First medium M1, in particular hot exhaust gas, flows through the tubes 1004, through the heat exchanger 1000 and leaves the heat exchanger 1000 through the outlet diffuser 1012. The second plate 1003 is connected in a cohesive and/or form-fitting fashion to the housing 801 in a way which is not illustrated. The second plate 1003 is connected to the housing 801 in particular by means of a bolt-nut connection. The housing 801 is formed in particular from plastic. The outlet diffuser 1012 is connected to the housing and/or to the second plate in a form-fitting manner by means of a bolt-nut connection. The outlet diffuser 1012 is designed such that the diameter reduces in size in the flow direction M1 of the first medium.

The heat exchanger 1000 is produced by means of a method which is characterized by the following steps:

The tubes 1004 are bundled. In a subsequent working step, the tubes 1004 are inserted into the first tube passage openings 1019 of the first plate 1005. The first tube end sections 1013 are subsequently flared such that the diameter of the tube 1004 is enlarged at least in sections in the region of the tube end sections, and in this way, a form-fitting connection is produced between the first plate and the tubes 1004. The first plate and the tubes 1004 which are connected thereto in a form-fitting fashion form a first modular unit. Said modular unit is inserted into the housing interior of the housing 801 in such a way that the second tube end sections are inserted into the first opening 1015. The tubes are pushed further into the interior of the housing 801, substantially parallel in the direction of the first medium M1, until the first plate 1005 is substantially in contact with the housing 801 at least in sections in an encircling fashion.

In a subsequent step, the tubes 1004 are inserted with the second tube end sections through the second tube passage openings 1020 of the second plate 1003. The tubes 1004 are flared in the region of the second tube end sections such that the diameter of the tubes 1004 is enlarged at least in sections and a form-fitting connection between the second plate 1003 and the tubes 1004 is produced. The second plate is in contact in an encircling fashion at least in sections with the housing 801. In a subsequent working step, the first plate 1005 is connected to the tubes 1004 in the region of the first tube end sections 1013 in a cohesive fashion by means of welding, soldering, adhesive bonding etc. During said joining process, the first plate 1005 is cooled by means of a device (not illustrated), so that the housing 801 and the first sealing element 1006 do not exceed a respective temperature at which the material of the housing 801, in particular plastic, and/or the material of the first sealing element 1006, in particular rubber, are destroyed.

Subsequently or at the same time, the second plate is connected in the region of the second tube passage openings 1020 in a cohesive fashion, in particular by means of welding, soldering, adhesive bonding etc. During the cohesive connection process or during the joining process, the second plate 1003 is cooled by means of a device (not illustrated). In this way, the housing 801 is prevented from exceeding a respective temperature at which the material of the housing 801, in particular plastic, and/or the material of the second sealing element 1011, in particular rubber, are destroyed. The cohesive connection of the first plate 1005 to the tubes 1004 and the cohesive connection of the second plate 1003 to the tubes 1004 can take place in parallel. In another exemplary embodiment, the first plate 1005 is firstly connected to the tubes 1004. The second plate 1003 is subsequently connected to the tubes 1004. In a further embodiment, the second plate 1003 is firstly connected to the tubes 1004 in a cohesive fashion and the first plate 1005 is subsequently connected to the tubes 1004 in a cohesive fashion.

In a subsequent working step, the outlet diffuser 1012 is connected to the housing 801 and/or to the second plate 1003 in a form-fitting manner by means of a bolt-nut connection. In another embodiment (not illustrated), the outlet diffuser is connected to the housing 801 and/or to the second plate 1003 by means of a flange connection, in particular a corrugated slot flange connection. In a further embodiment, the outlet diffuser 1012 is connected to the housing 801 and/or to the second plate 1003 in a cohesive fashion, in particular by means of welding, soldering, adhesive bonding etc. At the same time or previously or subsequently, the first plate 1005 is connected to the housing 801 in a form-fitting manner by means of a bolt-nut connection or by means of a flange connection, in particular a corrugated slot flange connection. In another embodiment, the first plate 1005 is connected to the housing 801 in a cohesive fashion, in particular by means of welding, soldering, adhesive bonding etc. The inlet pipe 802 for the second medium and the outlet pipe 803 are formed in one piece with the housing. In the exemplary embodiment illustrated, the inlet pipe 802 and the outlet pipe 803 are arranged on opposite sections of the housing 802. The inlet pipe 802 and the outlet pipe 803 can, in another exemplary embodiment (not illustrated), be arranged on the same side of the housing 801. In another embodiment (not illustrated), the inlet pipe 802 and the outlet pipe 803 can be arranged so as to be offset by an angle. The angle of offset between the inlet and outlet pipe can assume values from 0 to 360°.

In a further embodiment (not illustrated), the second plate 1003 is formed in one piece with the outlet diffuser 1012.

FIG. 11 shows an isometric illustration of a heat exchanger which can be traversed in an I-shaped flow. Identical features are provided with the same reference symbols as in the preceding figures.

The heat exchanger 1100 has a housing 1101. The housing 1101 is reinforced with reinforcement ribs (not shown in any more detail) which are formed in one piece with the housing 1101. The housing has a first flange 1106 and a second flange 1107. The first flange 1106 has a number, in particular four, of first flange connection openings (not shown). Arranged substantially parallel to the first flange 1106 is a first plate 1105. The first plate 1105 is in contact at least in sections with the first flange 1106. The first plate 1105 has a number of tube passage openings 1119 and a first bypass opening 1110. The first plate 1105 also has a number, in particular four, of first plate connection openings 1108.

In an embodiment which is not illustrated, the first flange connection openings and/or the second flange connection openings 1109 have sleeves (not illustrated). The sleeves can be retroactively pressed into the flange connection openings or, in another embodiment, can be formed into the first and/or the second flange already during the primary forming of the housing 1101, in particular during the injection molding process. The second flange 1107 has a number, in particular four second flange connection openings 1109. Arranged substantially parallel to the second flange 1107 is a second plate 1103. The second plate 1103 is in contact at least in sections with the second flange 1107. The second plate 1103 has a number (not illustrated), in particular four, of second plate connection openings. The second plate also has a second bypass opening (not illustrated). The first plate 1105 and the first flange 1106 are connected by means of connecting elements (not illustrated) which are inserted or screwed through the number of first plate connection openings 1108 and the number of first flange connection openings.

Connecting elements, in particular bolts, are inserted or screwed into the second flange 1107 through the number of second plate connection openings and the number of second flange connection openings 1109.

In addition to said type of connection of the first plate to the first flange and of the second plate to the second flange, other connections, for example a corrugated slot flange etc., are used in other embodiments.

By means of a bypass valve (not illustrated), the heat exchanger 1100 can be traversed either entirely through the bypass via the first bypass opening 1110 and the second bypass opening (not illustrated) in the region of the second plate 1103. The heat exchanger 1100 can also be traversed by the first medium, in particular the exhaust gas, entirely via the tubes 1104. The heat exchanger 1100 can also be traversed by the first medium M1, in particular the exhaust gas, partially through the bypass and additionally by the first medium M1, in particular the exhaust gas, through the number of tubes 1104.

The tubes 1104 are produced substantially from steel, in particular from high-grade steel. Furthermore, other materials such as for example plastic, ceramic etc. are also conceivable for the tubes 1104. The first plate 1105 and/or the second plate 1103 are formed from steel, in particular from high-grade steel. Furthermore, the first plate 1105 and/or the second plate 1103 can also be formed from other metals, from ceramic, from heat-resistant plastics etc.

FIG. 12 shows a section E-E of a heat exchanger which can be traversed in an I-shaped flow. Identical features are provided with the same reference symbols as in the preceding figures.

The heat exchanger 1200 has an inlet diffuser 1211. The inlet diffuser 1211 has an EGR valve (not illustrated) and/or a bypass flap 1201. The first medium M1, in particular the exhaust gas, enters into the inlet diffuser 1211. The quantity of first medium M1 flowing in is regulated by the EGR valve (not illustrated). Corresponding to the position of the bypass flap 1201, either all of the first medium M1 flows through the tubes 1004; in another position of the bypass flap 1201, all of the first medium M1 flows through a bypass (not illustrated). In a third position of the bypass flap 1201, a part of the first medium M1 flows through the tubes 1004 and another part of the first medium M1 flows through the bypass (not illustrated).

The outlet diffuser 1212 is connected to the second plate 1003 in a form-fitting and/or cohesive fashion, in particular by means of welding, soldering, adhesive bonding etc. In another embodiment (not illustrated), the outlet diffuser 1212 is formed in one piece with the second plate 1003.

An annular section 1213 is formed out of the outlet diffuser 1212. In the illustrated embodiment, said annular section 1213 is formed in one piece with the outlet diffuser 1212. In another embodiment (not illustrated), the annular section is connected to the outlet diffuser 1212 in particular in a cohesive fashion, by means of welding, soldering, adhesive bonding etc. The section 1213 can however also be of rectangular design or have some other shape. The outlet diffuser section 1213 is in contact at least in sections with the second sealing element 1011. The outlet diffuser section 1213 and the second sealing element 1011 sealingly close off the second opening (not shown) of the housing 801, so that no second medium M2 can emerge out of the second opening (not shown) of the housing 801.

In an embodiment which is not illustrated, the outlet diffuser section 1213 has an outlet diffuser groove (not illustrated) into which the second sealing element 1011 can be inserted. In the described embodiment, no second groove 1018 is formed in the housing 801.

Described below is a method for producing a heat exchanger which has the following steps:

The number of tubes 1004 is bundled. The first tube end sections 1013 are inserted into the first tube passage opening of the first plate 1005 and are connected to the first plate 1005 in a form-fitting and/or cohesive fashion, in particular by means of welding, soldering, adhesive bonding etc. The second tube end sections 1014 are inserted into the second tube passage openings of the second plate 1003 and are connected to the second plate 1003 in a form-fitting and/or cohesive fashion, in particular by means of welding, soldering, adhesive bonding etc. Here, the first plate 1005 is aligned substantially parallel to the second plate 1003. The first plate 1005 and the second plate 1003 are aligned substantially at right angles to the flow direction M1 of the first medium M1. The outlet diffuser 1212 is connected to the second plate 1003 in a form-fitting and/or cohesive fashion, in particular by means of welding, soldering, adhesive bonding etc., in such a way that the outlet diffuser section 1213 is aligned substantially parallel to the first plate 1005 and/or to the second plate 1003. In another embodiment (not illustrated), the second plate 1003 and the outlet diffuser 1212 are formed in one piece. The modular unit which is generated in this way is accordingly placed onto the tubes 1004 and connected to the latter in a form-fitting and/or cohesive fashion, in particular by means of welding, soldering, adhesive bonding etc.

The modular unit which is generated and which has the first plate 1005, the number of tubes 1004, the second plate 1003 and the outlet diffuser 1212, or the single-piece modular unit composed of the second plate 1003 and the outlet diffuser 1212, is inserted into the interior of the housing 801 through the first opening (not illustrated) substantially in the later flow direction M1 of the first medium M1 until the first plate comes into contact with the first flange (not shown).

FIG. 13 shows a plan view of a heat exchanger which can be traversed in an I-shaped flow. Identical features are provided with the same reference symbols as in the preceding figures.

The heat exchanger 1300 has an inlet diffuser 1311. The inlet diffuser 1311 has a bypass outlet 1314. The inlet diffuser 1311 also has an EGR valve 1315. The first medium M1, in particular exhaust gas, enters into the inlet diffuser 1311 and flows through the EGR valve. The EGR valve 1315 controls the mass flow of first medium M1 which traverses the heat exchanger 1300. After flowing through the EGR valve, the first medium M1 passes a bypass flap (not illustrated). Corresponding to the position of the bypass flap, either all of the medium is conducted through the heat exchanger 1300 and leaves the heat exchanger 1300 through the outlet diffuser 1312, or all of the first medium is conducted directly to the bypass 1314 and does not flow through the heat exchanger 1300 or a part of the first medium M1 flows through the heat exchanger 1300 in the direction of the outlet diffuser 1312 and the other part of the first medium M1 is conducted to the bypass 1314.

FIG. 14 shows a detail illustration F of the second seal section. Identical features are provided with the same reference symbols as in the preceding figures.

The detail of the heat exchanger 1400 shows a housing section 1401. The housing section 1401 has a second groove 1418. The groove 1418 is in particular formed in an encircling fashion in the housing. Said groove is generated for example during the injection molding of the housing section 1401. In another embodiment (not illustrated), the groove 1418 is generated by a cutting production process. A sealing element 1411, in particular an O-ring composed of rubber, is inserted into the groove 1418. The detail F also has a section of the outlet diffuser 1412. An outlet diffuser section 1413 projects from the outlet diffuser 1412. The outlet diffuser section 1413 is in contact at least in sections with the second sealing element 1411. In this way, the second medium M2, in particular the coolant, is prevented from emerging out of the housing interior 1402 of the housing 1401. In the illustrated embodiment, the outlet diffuser section 1413 is formed in one piece with the outlet diffuser 1412. In another embodiment (not illustrated), the outlet diffuser section 1413 is connected to the outlet diffuser in a cohesive fashion, in particular by means of welding, soldering, adhesive bonding etc.

FIG. 15 to FIG. 18 show a further exemplary embodiment of which only the housing 1501 of the heat exchanger is illustrated. The further components (not illustrated) correspond, for example, to the exemplary embodiment of FIG. 2.

The housing 1501 is formed as a single-piece plastic molded part, with an inlet 1502 and an outlet 1503 for the supply and discharge of the second medium, in particular coolant of a main cooling circuit of an internal combustion engine, being formed as hose connecting pipes. The housing has a flange 1504 with a groove 1505 into which is placed an annular sealing element 1506. An inlet-side plate as in FIG. 2 or FIG. 9 can be placed onto the flange.

Provided adjacent and parallel to the groove 1505 is a further groove 1507 which forms a flow duct for conducting the coolant. The groove 1507 is directly connected by means of a passage 1507a to the inlet 1502 which is arranged in the vicinity of the flange 1504. From the passage 1507a, the coolant flows in two partial flows in opposite directions along the further groove 1507. An aperture 1508 into the interior space of the housing 1501 is provided in the groove 1507 on the opposite side of the housing from the inlet 1502. At said aperture 1508, the two partial flows of the coolant are re-united and pass into the interior space of the housing for further cooling of the exchanger tubes. In this way, the coolant which enters at a particularly low temperature firstly cools the region of the sealing element 1506 and the contact points of the plastic housing 1501 with the metallic plate. In this way, a damaging introduction of heat from the first medium M1 via the plate into the housing plastic and/or the sealing element is prevented. A web 1509 which separates the grooves 1505 and 1507 can also be of shortened design or formed with a plurality of recesses such that the coolant flows at least partially directly along the sealing element 1506.

The apertures 1507a and grooves 1507 which conduct the second medium from the inlet 1502 to the passage 1508 form flow means within the context of the invention. Improved cooling of the region of the seal and the region of contact of the plastic housing 1501 against the plate is obtained by said flow means.

FIG. 19 schematically shows a further exemplary embodiment of a heat exchanger with an optimized flow of the second medium. The housing 1901 can fundamentally correspond to one of the other illustrated housings of an I-shaped flow or U-shaped flow heat exchanger, with the further components such as for example plates and exchanger tubes not being illustrated for simplicity. The housing 1901 is a plastic part with at least one, in particular inlet-side, connection 1902 for the in particular liquid second medium. The connection 1902 is formed as a connecting pipe, which is cylindrical in sections, for a coolant hose. A flared portion 1903 is provided between the actual interior space 1906 of the housing and the cylindrical section of the connection 1902. The flared portion 1903 has inclined walls 1904, 1905, so that the geometric passage cross section for the second medium increases over the flow path between the connection 1902 and the housing interior 1906. In this way, the medium flow which enters undergoes an expansion in various directions (diffusion) and has increasingly turbulent components imparted to it. Furthermore, in the present case, the inclination of the one wall 1904 with respect to an axis of symmetry of the connection 1902, which defines the geometric inlet direction of the second medium, is steeper than the inclination of the other wall 1905, so that the medium flow undergoes a change in its mean flow direction in the region of the flared portion.

The flared portion 1903 is a flow means within the context of the invention, with the flared portion optimizing the distribution of the second medium and its partial flows in the interior space 1906 of the housing 1901. The housing 1901 is in the present case a plastic housing, with the connection 1902 and the flared portion 1903 being formed in one piece with the housing.

FIG. 20 shows a further embodiment of a heat exchanger which is similar to that of FIG. 2. A bundle of exchanger tubes 2002 is arranged in a plastic housing 2001. The exchanger tubes 2002 are in each case formed as metallic flat tubes which conduct the first medium, in particular exhaust gas. A flow guiding element 2003 for deflecting the first medium M1 is connected, in a similar way to FIG. 2, by means of a plate 2004 to the exchanger tubes 2002.

The exchanger tubes 2002 have, similarly to FIG. 2, molded portions 2005 in their walls, which molded portions 2005 are formed as embossed portions. The molded portions project beyond the wall faces of the tubes 2002 into the second medium. Said molded portions are in particular approximately equal or equal in height to the spacing between adjacent exchanger tubes 2002, such that the flow of the second medium is influenced by the embossed portions. This can involve a change in the main flow direction and/or locally generated turbulence in the second medium. The molded portions 2005 are flow means within the context of the invention.

FIG. 21 shows an embodiment of the heat exchanger as in FIG. 20. In addition to the embodiment as per FIG. 20, molded portions 2102 in the manner of projections of the housing walls are formed in the housing 2101. The projections 2102 are approximately triangular in cross section and project into the interior space of the housing up to a short distance from the heat exchanger tubes 2003. At said points, the free flow cross section for the second medium in the edge region of the housing is narrowed, so that the medium flows to an increased extent between the exchanger tubes. Depending on the arrangement of the projections 2102, the main flow of the second medium can also undergo multiple deflections and have a more complex profile. The projections 2102 are formed such that the free cross section of the housing 2101 remains sufficient to insert a pre-manufactured unit composed of plates and exchanger tubes into the housing. In FIG. 21, this is made possible in particular in that two projections 2102 of opposite sides are arranged so as to be offset in the longitudinal direction, so that the deflecting region 2104 which is thickened in diameter is conducted firstly past the one and subsequently past the other projection 2102. For simplicity of assembly, the projections 2102 have, for this purpose, flanks 2105 which are flattened in the insertion direction of the pre-manufactured module.

FIG. 22 and FIG. 23 show a schematically illustrated embodiment which is similar to FIG. 2. Fixed to the housing 2201, which is composed of plastic, is a plate 2202 which is formed as a sheet metal molded part and which holds a bundle of exchanger tubes 2203. At the edge side, the plate 2202 bears directly against a flange 2204, in which a sealing means 2205 is inserted in a groove, of the housing 2201. As a result of the plate 2202 being composed of metal and therefore having good thermal conductivity, there is the problem of the introduction of heat into the sealing element and into the housing region with which it is in contact. In order to reduce the heat which is supplied to said contact points, the plate has, in the direct vicinity of the flange 2204, a molded portion in the form of a double bend 2206, by means of which the path of the heat conduction and the surface of the plate which is in contact with the coolant are enlarged. A molded portion of said type is cost-effective and can be easily formed into a sheet metal molded part.

An alternative or additional variant of the molded portion for enlarging the area of the plate in the vicinity of the sealing element is shown in FIG. 24. Here, the molded portion is formed as a sheet metal part which is attached by means of soldering or welding.

It is also alternatively or additionally possible for the molded portion to be formed, as per FIG. 25, as a formed-in channel or corrugation 2206*b* of the plate, which allows the plate to be formed in one piece in particular as a sheet-metal molded part, as in FIG. 22.

The variants of the molded portion 2206, 2206*a*, 2206*b* are flow means within the context of the invention.

FIG. 26 shows an embodiment of a heat exchanger which is similar to the embodiments from FIG. 20 and FIG. 21. A bundle of tubes 2603 for conducting the first medium M1 is held at the end side in a plate element 2602 which opens out into a flow guiding element 2604 for deflecting the first medium.

The tubes 2603 have, over their profile, a lateral spacing with respect to the surrounding wall of the housing 2601, which in the present case is composed of plastic. Furthermore, the tubes have a lateral spacing with respect to one another, so that the second medium M2 which is conducted in the housing 2601 can flow between the tubes 2603. The spacing between the tubes 2603 and the housing 2601 is firstly construction-related on account of a lateral protrusion of the plate element 2602. Secondly, said spacing will be relatively large for safety reasons, in order to prevent direct contact of the housing 2601 and tubes 2603 under all circumstances. A typical spacing between the tubes is approximately 1.5 mm, while the spacing between the tubes and the housing is typically approximately 5 mm and is therefore significantly larger. As a result of this, the second medium M2 would preferentially flow between the edge-side tubes and the housing wall and only to a small extent between adjacent tubes 2603.

In order to increase the proportion of the medium M2 which flows between the tubes 2603, a plurality of guiding elements 2606 are arranged on the tube bundle which at least partially block the passage of the second medium between the tube bundle and the housing 2601. The guiding elements 2606 are formed from sheet metal molded parts composed of high-grade steel. They form in each case a closed frame which, with its outer edge, is directly adjacent to or even abuts against the housing 2601, and which, with its inner edge, surrounds and is supported on the tube bundle 2603. For this purpose, resiliently elastic members 2607 in the form of angled segments are provided in the region of the inner edge of the frame-like guiding elements 2606. As shown in particular by the illustration in FIG. 27, the segments 2607 bear in a resiliently elastic, clamped fashion against the surface of the outer tubes 2603 of the tube bundle.

Similarly to the embodiment from FIG. 20, the tubes 2603 have projections of the first type 2505 which project into the second medium M2 from the tube surface. Furthermore, the tubes have projections of the second type 2505a, which, in the manner of known winglets, project into the tubes 2603 and into the first medium M1.

The projections of the first type 2605 improve the turbulence generation in the second medium M2 and therefore the exchange of heat. Furthermore, said projections provide additional form-fitting retention of the guiding elements 2606, such that the latter remain in position in the longitudinal direction of the tube bundle. In this way, the guiding elements 2606, which are attached in a clamped but not cohesive (for example soldered) fashion, are prevented from slipping during assembly and also during operation.

In FIG. 26, for better clarity, only two tubes 2603 of the tube bundle are illustrated. The assembly of the heat exchanger takes place such that firstly the tubes 2603 are welded to the plate 2602 and/or if appropriate to further elements (not illustrated) in the inlet region of the first medium. During the course of said assembly of the tube bundle, the guiding element 2606 is pushed onto the tube bundle. The finished tube bundle is then pushed into the housing 2601 from the side of the housing flange illustrated in FIG. 26. In the event of any collisions of the guiding elements 2606 against projections of the housing 2601 (for example the flange), the guiding elements 2606 can deflect in a resiliently elastic fashion, such that the assembly is simple and reliable.

In the assembled state, the spacing between the housing 2601 and guiding elements 2606 is sufficiently small, for example approximately 1 mm in the context of the above-mentioned numerical example. The guiding elements 2606 can also bear directly against the housing. If the guiding elements 2606 are formed from steel sheet so as to be sufficiently thin, there is only a relatively small amount of heat conduction from the tube surfaces to the housing wall.

The features of the various exemplary embodiments can be combined with one another in any desired manner. The invention can also be used in fields other than that shown.

The invention claimed is:

1. A heat exchanger, comprising:
a housing comprising an integrally formed one-piece shell having a single open end, wherein a groove formed in the shell encircles about an opening at the single open end;
a plate having openings and a flat peripheral surface, wherein the flat peripheral surface of the plate extends across an entire width of the groove;
a plurality of tubes through which at least a first medium can flow and around which a second medium can flow within an interior space of the housing, the plurality of tubes being held in the openings of the plate;
at least one sealing element disposed in the groove within the shell;
a flow duct through which the second medium can flow to contact sections of the sealing element; and
a flow guiding element having at least one guide element,
wherein the flow duct is formed between the flat peripheral surface of the plate and an end surface of the shell opposing the flat peripheral surface of the plate and extending between the opening of the shell and the groove, and
wherein the housing has at least one mating guide element configured to connect in a form-fitting manner to the at least one guide element of the flow guiding element.

2. A heat exchanger, comprising:
a housing comprising an integrally formed one-piece shell having a single open end, wherein a groove formed in the shell encircles about an opening at the single open end;
a plate having openings and a flat peripheral surface, wherein the flat peripheral surface of the plate extends across an entire width of the groove;
a plurality of tubes through which at least a first medium can flow and around which a second medium can flow, the plurality of tubes being held in the openings of the plate;
at least one sealing element disposed in the groove within the shell;
a flow duct disposed within the housing through which the second medium can flow to contact sections of the sealing element, wherein the flow duct is formed between the flat peripheral surface of the plate and an end surface of the shell opposing the flat peripheral surface of the plate and extending between the opening of the shell and the groove;
at least one turbulence generator around which the second medium can flow, the turbulence generator configured to improve an exchange of heat from the first medium to the second medium; and
a flow guiding element having at least one guide element,
wherein the housing has at least one mating guide element configured to connect in a form-fitting manner to the at least one guide element of the flow guiding element.

3. The heat exchanger as claimed in claim 2, wherein the turbulence generator comprises a molded portion which projects into the second medium from a wall of a tube through which the first medium flows.

4. The heat exchanger as claimed in claim 3, wherein the molded portion is an embossed, structured portion of the wall of the tube.

5. The heat exchanger as claimed in claim 3, wherein the molded portion comprises a rib element.

6. The heat exchanger as claimed in claim 1, wherein a housing duct is formed within a wall of the housing.

7. The heat exchanger as claimed in claim 6, wherein the housing duct and the housing are formed as a single-piece plastic molded part.

8. The heat exchanger as claimed in claim 2, wherein the turbulence generator comprises a flared portion of a connection region for the second medium.

9. The heat exchanger as claimed in claim 8, wherein the flared portion comprises an inclined wall section, with a geometric passage cross section for the second medium widening continuously via the inclined wall section.

10. The heat exchanger as claimed in claim 8, wherein the flared portion is shaped asymmetrically with respect to a geometric inlet direction of the second medium.

11. The heat exchanger as claimed in claim 2, wherein the turbulence generator comprises a projection which is formed on a wall of the housing.

12. The heat exchanger as claimed in claim 11, wherein a passage cross section between the wall and a tube which conducts the first medium is reduced by the projection.

13. The heat exchanger as claimed in claim 2, wherein the turbulence generator comprises a thermally conductive molded portion, which is arranged in a vicinity of the sealing element, of the plate.

14. The heat exchanger as claimed in claim 13, wherein a surface, which is in contact with the second medium, of a region of the plate which is adjacent to the sealing element is enlarged by the molded portion.

15. The heat exchanger as claimed in claim 13, wherein the molded portion of the plate comprises a sheet metal molded part, which is connected in a thermally conductive manner to the plate.

16. The heat exchanger as claimed in claim 13, wherein the molded portion is formed in one piece with the plate.

17. The heat exchanger as claimed in claim 16, wherein the molded portion comprises at least one formed-in channel, which projects into the second medium, of the plate.

18. The heat exchanger as claimed in claim 16, wherein the plate is formed as a sheet metal molded part, with the molded portion being formed as a multiple bend of the sheet metal molded part in the vicinity of the sealing element.

19. The heat exchanger as claimed in claim 1, wherein the housing is formed from a heat-resistant material.

20. The heat exchanger as claimed in claim 1, wherein the housing is formed from plastic.

21. The heat exchanger as claimed in claim 1, wherein at least one connecting pipe, at least one connecting flange, at least one fastening element or a combination thereof are integrally formed in one piece with the housing.

22. The heat exchanger as claimed in claim 1, wherein the groove is flow-connected to the interior space of the housing.

23. The heat exchanger as claimed in claim 1, wherein the heat exchanger can be traversed by the first medium in a U-shaped flow.

24. The heat exchanger as claimed in claim 1, further comprising at least one bypass.

25. The heat exchanger as claimed in claim 1, further comprising at least one bypass flap.

26. The heat exchanger as claimed in claim 1, wherein the heat exchanger has a first opening and at least one second opening, and the heat exchanger can be traversed in an I-shaped flow.

27. The heat exchanger as claimed in claim 1, wherein a second sealing element can be inserted into a second groove, with the second sealing element coming into contact at least in sections with the second medium.

28. The heat exchanger as claimed in claim 1, further comprising:
a first plate configured to connect in a form-fitting fashion, a cohesive fashion or a combination thereof, at least in sections to the housing, and
a second plate configured to connect in a form-fitting fashion, a cohesive fashion or a combination thereof, at least in sections to the housing.

29. The heat exchanger as claimed in claim 28, wherein the first plate has at least one tube passage opening for holding at least one tube.

30. The heat exchanger as claimed in claim 28, wherein the second plate has at least one second tube passage opening for holding at least one tube.

31. The heat exchanger as claimed in claim 28, wherein first tube end sections of the plurality of tubes can be connected in a form-fitting fashion, a cohesive fashion or a combination thereof to the first plate.

32. The heat exchanger as claimed in claim 28, wherein second tube end sections of the plurality of tubes can be connected in a form-fitting fashion, a cohesive fashion or a combination thereof to the second plate.

33. The heat exchanger as claimed in claim 27, wherein a diffuser is in contact at least in sections with the second sealing element.

34. The heat exchanger as claimed in claim 2, wherein the first medium is conducted in a tube bundle, with the turbulence generator comprising a guiding element which is arranged on the tube bundle and which projects at least partially into an intermediate space between the tube bundle and the housing.

35. The heat exchanger as claimed in claim 34, wherein the guiding element is formed substantially as a sheet-metal molded part from a high-grade steel.

36. The heat exchanger as claimed in claim 34, wherein the guiding element is formed as a frame which substantially completely surrounds the tube bundle.

37. The heat exchanger as claimed in claim 34, wherein the guiding element has at least one resiliently elastic member, with the guiding element being held in a clamped manner, a form-fitting manner or a combination thereof on the tube bundle by the resiliently elastic member.

38. The heat exchanger as claimed in claim 34, wherein the tube bundle can be inserted, together with the guiding element fixed thereto, into the housing.

39. The heat exchanger as claimed in claim 38, wherein the guiding element is movable in a resiliently elastic fashion at least in one movement direction of the insertion of the tube bundle into the housing in order to give way to any projections of the housing during the course of the insertion.

40. The heat exchanger as claimed in claim 34, wherein a spacing which remains between the guiding element and a wall of the housing is not significantly larger than a spacing between adjacent tubes of the tube bundle.

41. A method for producing the heat exchanger as claimed in claim 1, wherein at least one connecting pipe, at least one connecting flange, at least one fastening element or a combination thereof are integrally formed in one piece with the housing by injection molding.

42. A method for producing the heat exchanger as claimed in claim 25, wherein the housing, the bypass flap and a plate are assembled in one assembly operation, and are connected in one screwing operation.

43. A method for producing the heat exchanger as claimed in claim 28, comprising the following steps:
a) inserting the plurality of tubes flush into the first plate;
b) connecting first tube end sections in a form-fitting fashion, a cohesive fashion or a combination thereof to the first plate; and
c) inserting the plurality of tubes which are connected to the first plate into the housing.

44. The method as claimed in claim 43, further comprising inserting second tube end sections flush into the second plate, with the first plate subsequently being cohesively connected by welding, soldering, or adhesive bonding to the first tube end sections while the first plate is cooled, the second plate being cohesively connected by welding, soldering, or adhesive bonding to the second tube end sections while the second plate is cooled or a combination thereof.

45. The method as claimed in claim 44, wherein the first plate, the second plate or a combination thereof are connected to the housing.

46. A method for producing the heat exchanger as claimed in claim 33, comprising the following steps:
a) inserting the plurality of tubes flush into a first plate and flush into a second plate;
b) connecting first tube end sections in a form-fitting fashion, a cohesive fashion of a combination thereof to the first plate, and connecting second tube end sections in a form-fitting fashion, a cohesive fashion of a combination thereof to the second plate;
c) inserting the plurality of tubes which are connected to the first plate and to the second plate into the housing; and
d) connecting the diffuser to the second plate in a cohesive fashion by welding, soldering, or adhesive bonding such that the second sealing element and the diffuser are in contact at least in sections.

47. The heat exchanger as claimed in claim 1, wherein the plurality of tubes are configured such that a hot exhaust gas as the first medium can flow therethrough and a coolant as the second medium can flow within the interior space of the housing.

48. The heat exchanger as claimed in claim 2, wherein the plurality of tubes are configured such that a hot exhaust gas as the first medium can flow therethrough and a coolant as the second medium can flow within the interior space of the housing.

49. The heat exchanger as claimed in claim 1, wherein the sealing element is an O-ring.

50. The heat exchanger as claimed in claim 2, wherein the sealing element is an O-ring.

51. The heat exchanger as claimed in claim 1, wherein the housing consists of an integrally formed one-piece shell made by injection molding.

52. The heat exchanger as claimed in claim 2, wherein the housing consists of an integrally formed one-piece shell made by injection molding.

* * * * *